(12) United States Patent
Rottier et al.

(10) Patent No.: US 11,267,655 B1
(45) Date of Patent: Mar. 8, 2022

(54) TOOLLESS REMOVABLE WEAR STRIP AND/OR GUIDE RAIL FOR A CONVEYOR

(71) Applicant: Nercon Eng. & Mfg., Inc., Neenah, WI (US)

(72) Inventors: Andrew Francis Rottier, Suamico, WI (US); Jeffrey Kent Falash, Crivitz, WI (US); Michael Paul Weickert, Oshkosh, WI (US); Erik Kristian Schiebel, Menasha, WI (US)

(73) Assignee: NERCON ENG. & MFG., INC., Neenah, WI (US)

(*) Notice: Subject to any disclaimer, the term of this patent is extended or adjusted under 35 U.S.C. 154(b) by 0 days.

(21) Appl. No.: 17/114,355

(22) Filed: Dec. 7, 2020

Related U.S. Application Data

(62) Division of application No. 16/228,409, filed on Dec. 20, 2018, now Pat. No. 10,858,193.

(60) Provisional application No. 62/609,175, filed on Dec. 21, 2017.

(51) Int. Cl.
*B65G 21/02* (2006.01)
*B65G 21/22* (2006.01)
*B65G 15/62* (2006.01)
*B65G 21/06* (2006.01)

(52) U.S. Cl.
CPC .......... *B65G 21/02* (2013.01); *B65G 15/62* (2013.01); *B65G 21/06* (2013.01); *B65G 21/22* (2013.01)

(58) Field of Classification Search
CPC ........ B65G 21/06; B65G 21/02; B65G 15/62; B65G 21/22; B65G 2207/26
USPC ........ 198/860.1, 861.1, 835, 813, 814, 837, 198/841
See application file for complete search history.

(56) References Cited

U.S. PATENT DOCUMENTS

| | | | | |
|---|---|---|---|---|
| 4,846,338 A * | 7/1989 | Widmer | ................ | B65G 15/00 198/831 |
| 5,458,051 A * | 10/1995 | Alden | ................ | A47J 37/044 198/626.5 |
| 6,209,175 B1 * | 4/2001 | Gershenson | ............ | F16B 5/065 24/297 |
| 7,448,491 B1 * | 11/2008 | Tippery | ................ | A01D 57/20 198/813 |
| 7,549,531 B2 * | 6/2009 | Hosch | ................ | B65G 21/105 198/493 |
| 2005/0045452 A1 * | 3/2005 | Iseli | ................ | B65G 23/44 198/813 |
| 2013/0062167 A1 * | 3/2013 | Alotto | ................ | B65G 21/06 198/813 |
| 2015/0158676 A1 * | 6/2015 | Finnsson | ............ | B65G 47/5122 198/444 |

* cited by examiner

*Primary Examiner* — James R Bidwell
(74) *Attorney, Agent, or Firm* — Brannen Law Office, LLC

(57) ABSTRACT

A dynamic noser assembly used with a conveyor having pegs is provided. The dynamic noser assembly has a noser with a noser inner side, a noser outer side, a first lateral side, a second lateral side, a rear side and a front side. The dynamic noser further has a first hole with a first hole slot accessible via the noser inner side and a first hole notch, and a second hole with a second hole slot accessible via the rear side and a second hole notch. The noser is alignable with the pegs to lock the noser in place when the pegs are received within notches. The dynamic noser assembly further as a shaft removably connected to the noser, the shaft supporting at least one bearing. The noser front side has a channel formed therein for removably receiving the bearing shaft.

6 Claims, 46 Drawing Sheets

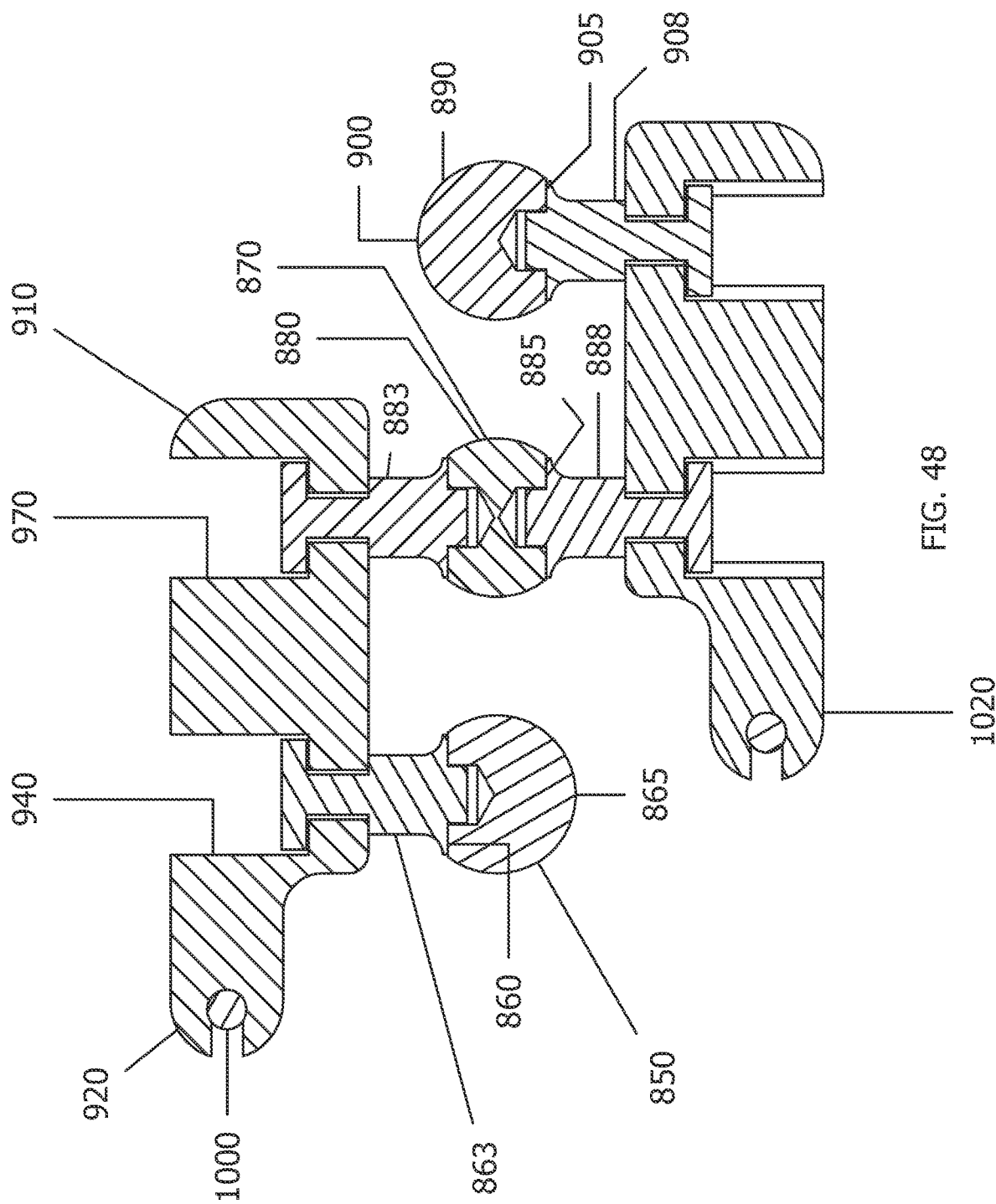

TOOLLESS REMOVABLE WEAR STRIP AND/OR GUIDE RAIL FOR A CONVEYOR

This United States utility patent application (divisional) claims priority on and the benefit of pending nonprovisional application Ser. No. 16/228,409, filed Dec. 20, 2018, which itself claims priority on and the benefit of provisional application 62/609,175 filed Dec. 21, 2017, the entire contents of both are hereby incorporated herein by reference.

BACKGROUND OF THE INVENTION

1. Field of the Invention

The present invention relates to a wear strip for a conveyor, and in particular to a wear strip that is replaceable without tools.

2. Description of the Related Art

Many types of conveyor systems currently exist. Many are designed with replaceable wear parts that can be replaced as needed. Designing in wear elements can protect and extend the lifespan of the conveyor assembly, as individual components that are subject to stresses and damage during use can be replaced.

Some examples include:

United States Patent Number ("USPN") U.S. Pat. No. 3,779,368 to Smith is titled Wear Strip Construction for Conveyor. It shows an improved wear strip construction for a conveyor. The conveyor includes a pair of spaced side walls and the upper and lower extremities of each side wall are provided with inwardly extending flanges. Metal wear strips are snap fitted on the upper flanges of the side walls and serve to support the side edges of a plastic link belt conveyor chain in a conveying path of travel, while a sinusoidal metal wear strip is supported on the lower flanges of the side walls and serves to support the link chain in its return path of travel.

U.S. Pat. No. 3,964,800 to Grimes et al. is titled Wear Strip. It shows a wear strip for conveyor chains comprising a flat upper wear member having at least two spaced-apart holes therethrough for the reception of connection means, at least one linear support member joined to the underside of the wear member, and at least two base members joined to the underside of the wear member and having holes therethrough in registry with the holes through the wear member. The whole wear strip is preferably integrally injection molded, and each of the holes in the wear member are preferably countersunk on the upper surface. Two embodiments are disclosed, one in which one linear support member is joined to the wear member along each lateral edge thereof and one in which a single linear support member is joined to the wear member along one lateral edge thereof.

U.S. Pat. No. 4,325,480 to Butt is titled Conveyor Support Way. It shows a conveyor support way for a table top chain comprises a series of alternating first and second cross members in spaced disposition transverse to the axis of the conveyor support way. Each of the first cross members contains a first pair of open top spaces and each of said second cross members contains a second pair of open top spaces, the first pair of spaces being disposed laterally inwardly of the second pair of spaces. A pair of serpentine wear strips are provided to support the chain, each of the wear strips extending along the length of the series of cross members, alternately through an associated one of the first cross member spaces and through an associated one of the second cross member spaces. Each wear strip is axially slidably and easily removably mounted on the series of cross members.

U.S. Pat. No. 5,186,314 to Clopton is titled Conveyor System. It shows a conveyor system is provided comprising conveyor beams, conveyor frame members, conveyor accessory mounting brackets, connectors, wearstrip converters, and various combinations of each. The conveyor beam comprises first and second side walls connected in one piece by an integral web, a first flange disposed along at least the tops of the side walls to support a conveyor, and at least two mounting slots on outer surfaces of each side wall. The conveyor frame members comprise at least three mounting slots formed in sides thereof, at least one of the mounting slots open to each of three different directions, and at least one flange disposed along an edge of the frame member to support a conveying surface. The brackets are for mounting conveyor accessories to the conveyor beams and frame members. The connectors are for connecting conveyor beams or frame members together. And the converters are for altering the location or orientation of wearstrips.

U.S. Pat. No. 5,190,145 to Ledginham et al. is titled Apparatus for Supporting Conveyor Belts. It shows a multifunction return-way system for one or more chains in a conveyor system. U-shaped mounting clips, having U-shaped arm ends, are snapped onto cross members between frame portions of the conveyor system, and are shaped to have snapped therein wear strips that are oriented in serpentine manner as viewed from above. Portions of the wear strips are maintained spaced apart by spacers mounted onto the rods and by spacer pins that are provided on the mounting clips for association with each other or with side frames. The mounting clips are thus trapped in desired locations. Intermediate clips, or pinch clips, are provided to hold central regions of the wear strips close to each other, at regions where there are no cross members.

U.S. Pat. No. 5,355,994 to Foster is titled Replaceable Wear Surface for Conveyor Slats. It shows a replaceable wear plate assembly for a reciprocating floor conveyor that includes a plurality of elongated slat members mounted adjacent each other in a common plane. A replaceable wear plate is provided for each slat member of the reciprocating floor conveyor. The slat members are formed with a ridge and inwardly projecting lip extending along the side edges of each slat member. The ridge and lip portion form a slot along the side edges of the slat members for receiving the side edges of the replaceable wear plates. The ridge and lip portion and the edges of the wear plates form a tongue and groove arrangement whereby the movement of the wear plate is restricted sideways and in a vertical direction. A connector is provided to secure each wear plate to its slat member in order to restrict movement of the wear plate longitudinally along its length.

U.S. Pat. No. 5,419,426 to Foster is titled Snap-in Conveyor Slat Wear Plate. It shows a wear plate for each conveyor slat of a reciprocating floor conveyor, each wear plate biased laterally by an O-ring tube, so that one side edge of each wear plate is pressed into a slot formed by a side ridge and lip of a conveyor slat. O-ring tube biases wear plate laterally so that side edge is secured in slot and wear plate is held on conveyor slat.

U.S. Pat. No. 6,523,679 to Manchester is titled Conveyor Frame with Removable Wear Strips. It shows a modular sanitary conveyor includes a longitudinal conveyor bed frame that is slidably received and supported on a support stand and a motor and clutch assembly that is slidably received and supported on the side of the frame. The frame has lateral side walls secured together by a series of cross members and has a serpentine support way for supporting belts and table top chains that is formed of individual wear strips that are installed, retained in place, and removed without the use of tools. Unitary bearings are slidably received in slots at each end of the side walls and rotatably support a drive sprocket shaft and an idler sprocket shaft having respective drive sprockets and idler sprockets slidably received thereon. All components can be easily and quickly disassembled for cleaning and reassembled without the use of special tools.

U.S. Pat. No. 7,681,719 to Hosch et al. is titled Sanitary Conveyor Transfer Tail Assembly. It shows a transfer tail assembly for use with a conveyor assembly that creates a reduced radius transition from the upper run to the lower run of a continuous conveyor belt used with the conveyor assembly. The transfer tail assembly includes a stationary nose bar over which the continuous conveyor belt passes at the end of the conveyor assembly. The nose bar is supported at the end of the conveyor assembly by a series of support brackets mounted to a cross support. Each of the support brackets is formed from a wear resistant material and contacts the conveyor belt as the conveyor belt passes around the transfer tail assembly. The nose bar, support brackets and cross support are mounted within the tail assembly without the use of any external connectors and thus require no tooling to assemble and disassemble.

U.S. Pat. No. 7,757,840 to Rogers et al. is titled Conveyor Wear Bar Assembly. It shows an improved conveyor assembly includes a conveyor belt for conveying a product to one or more product operations is disclosed. Such conveyor assembly includes a pair of spaced apart side frames that support the conveyor belt and between which the conveyor belt rotates. The side frames are formed from an upstanding member and a inwardly extending horizontal member. Both the frame upstanding member and the frame horizontal member carry a series of elongated slots. One or more L-shaped brackets are formed from a generally upstanding member and an inwardly extending member. Both the bracket upstanding member and the bracket horizontal member carry a series of elongated slots. The bracket horizontal member slots are configured to overlay the frame elongate horizontal member slots, and the bracket upstanding member slots are configured to overlay the frame upstanding member slots for attaching components to the frames.

None of these references show the present invention. Thus, there exists a need for a wear strip for a conveyor that solves these and other problems.

SUMMARY OF THE INVENTION

A wear strip for a conveyor having a frame with frame spacers is provided. There are two frame spacers at one end of the frame, each having at least one lock. The lock has a riser and a head, wherein the head is wider than the riser forming a generally but not limited to T-shaped profile. A wear strip having a hole with an upper cavity and a lower passage having a wide gap and narrow gap is provided. The wear strip can be secured by the lock. This is accomplished by mounting the wear strip on the frame spacers so that the head of the lock projects into the upper cavity of the wear strip. Then, the wear strip is longitudinally moved so that the riser enters the narrow gap in the wear strip. Longitudinal wear strips can be inserted that longitudinally lock the wear strips in place.

According to one advantage of the present invention, wear strip can be easily removed without any tools. This is accomplished by the locking features of the present invention that secure the wear strips in place (vertically and longitudinally). The wear strips can be movable parallel to the frame longitudinal axis for removal. Longitudinal wear strips can be inserted which abut the wear strips preventing them from being longitudinally moved for removal.

According to another advantage of the present invention, the frame spacer has locks that have a riser and a head so that the lock has a T-shaped profile. The wear strip has a hole that mates with the lock. The hole has an upper cavity and a lower passage. The lower passage has a wide gap and a narrow gap. The head of the lock can be passed through the wide passage so that it enters the upper cavity. Then, when the wear strip is slid relative to the frame, the head vertically locks the wear strip in place as the head cannot pass the narrow passage.

In another embodiment, a dynamic noser assembly is provided having a noser and a bearing shaft with bearings to increase the usefulness of the noser assembly. The noser assembly is easily removed from a locked relationship to pegs on frame spacers.

According to another advantage of the present invention, the dynamic noser assembly is a dynamic sanitary noser. The nose can be made of a solid one-piece design.

According to a further advantage of the present invention, the dynamic noser is a sanitary dynamic noser assembly.

Other advantages, benefits, and features of the present invention will become apparent to those skilled in the art upon reading the detailed description of the invention and studying the drawings.

BRIEF DESCRIPTION OF THE DRAWINGS

FIG. 48 is a cross-sectional view taken along line 48-48 in FIG. 41.

DETAILED DESCRIPTION OF PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 1:
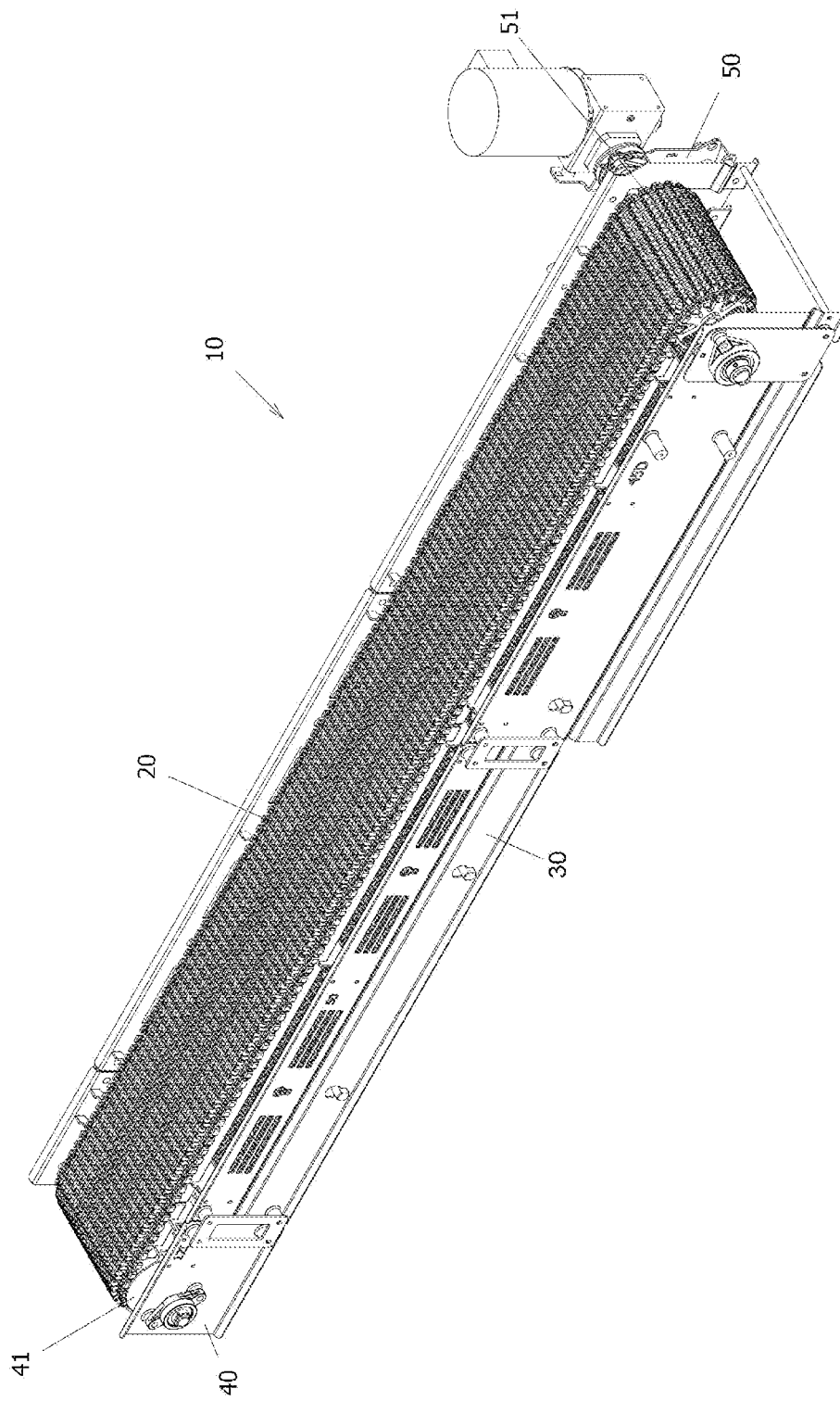
FIG. 1 is a perspective view of a conveyor.
Figure 2:
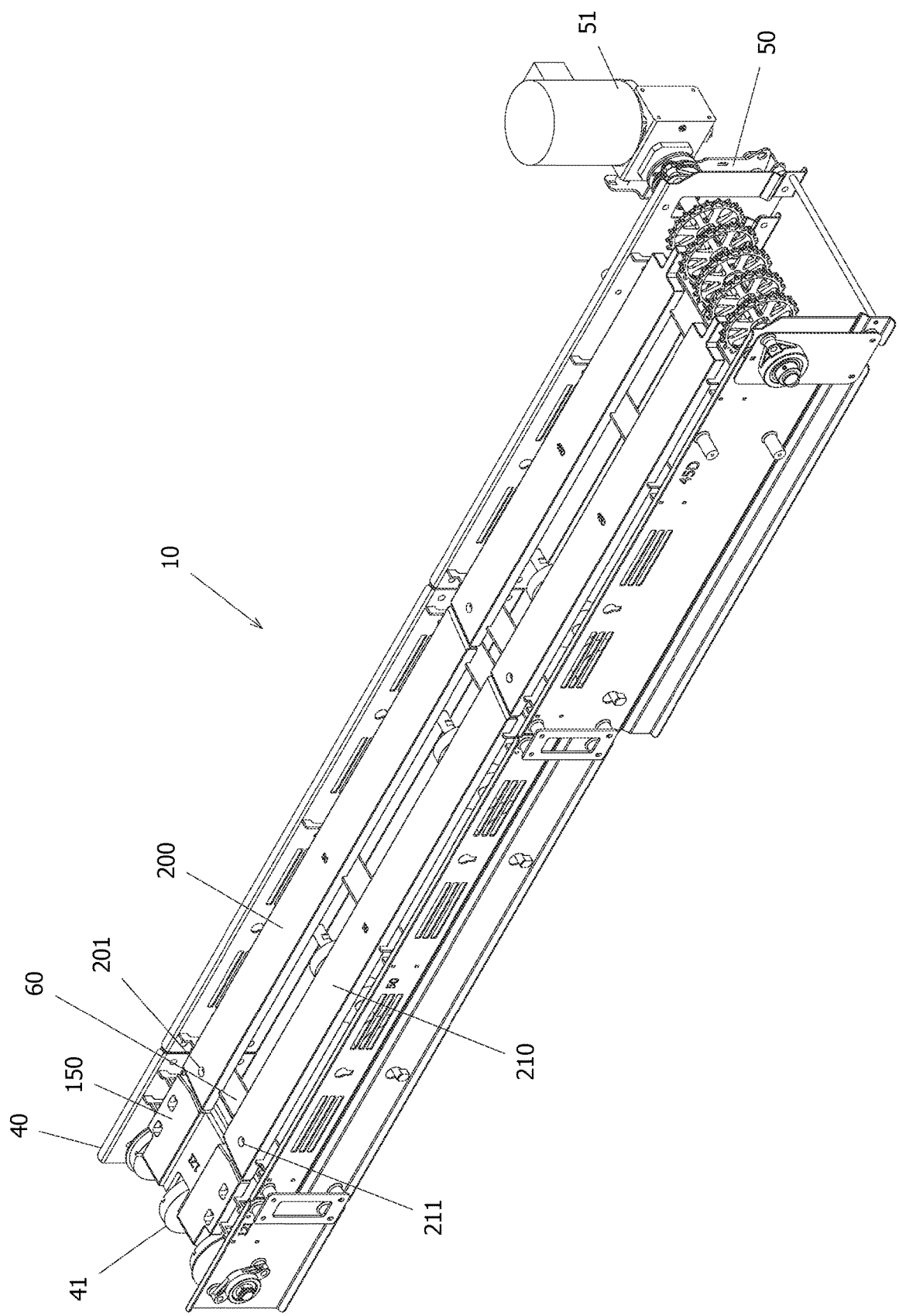
FIG. 2 is similar to FIG. 1 but shows the belt removed.
Figure 3:
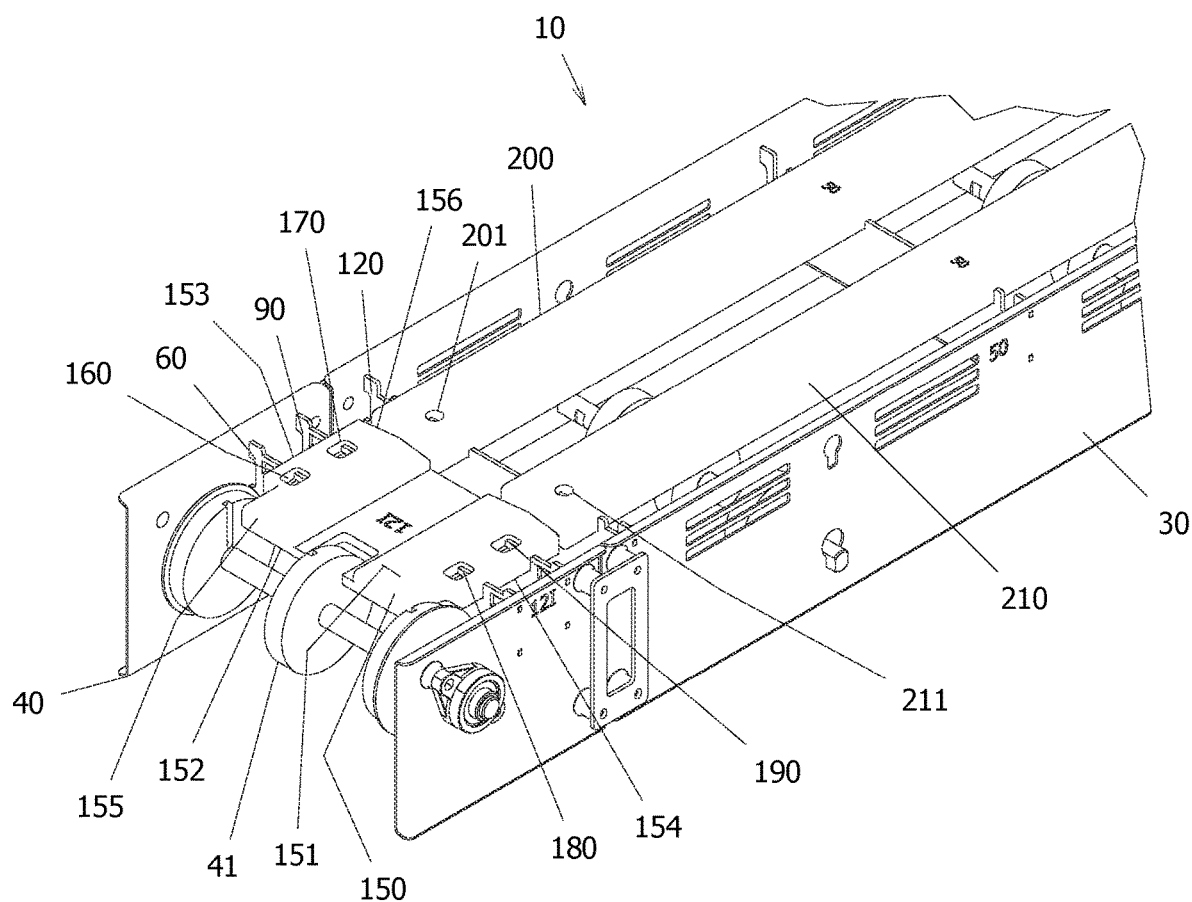
FIG. 3 is a perspective view of an end of a conveyor with the belt removed to expose idler wears strips that are vertically and longitudinally locked relative to the frame.
Figure 4:
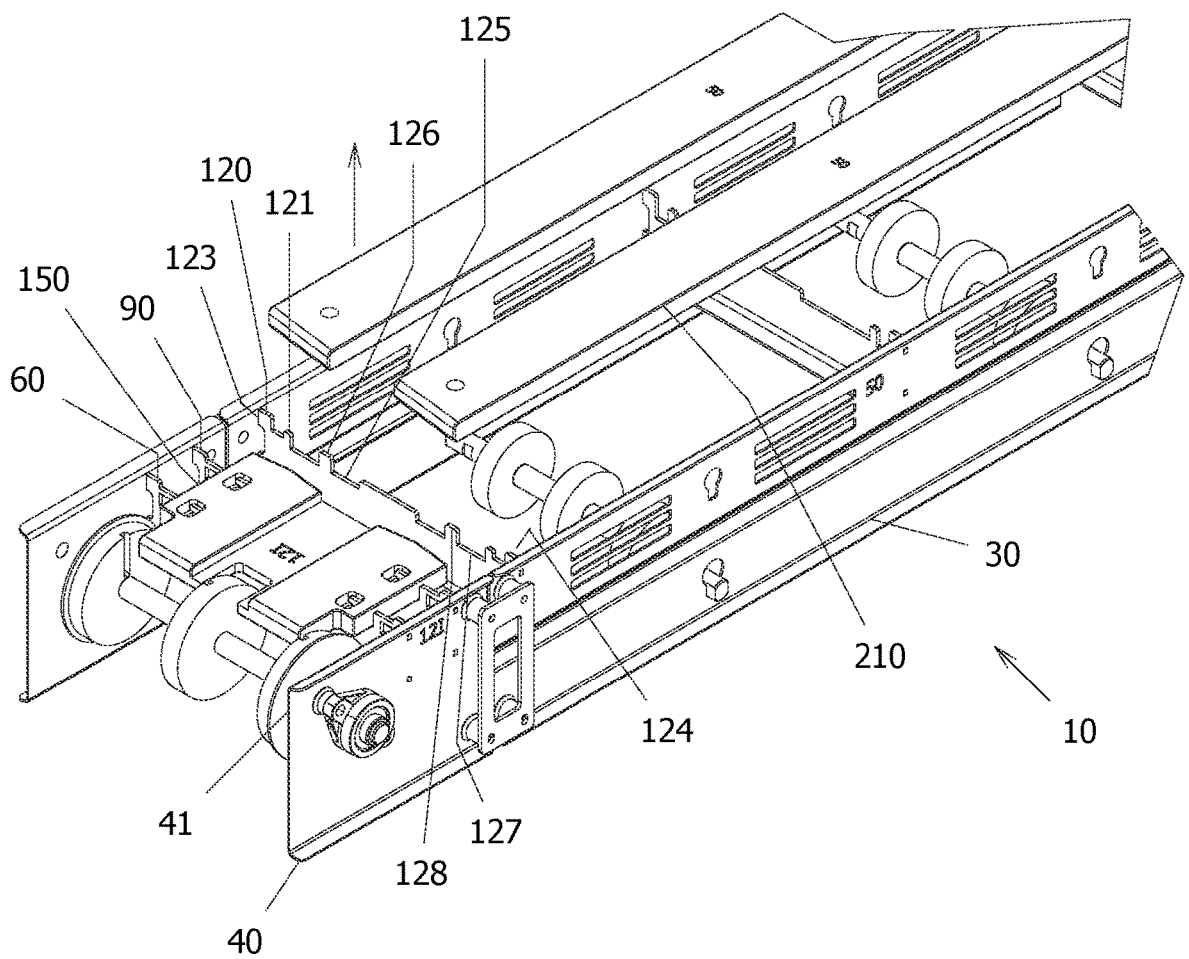
FIG. 4 is similar to FIG. 3, but shows longitudinal wear strips being removed.
Figure 5:
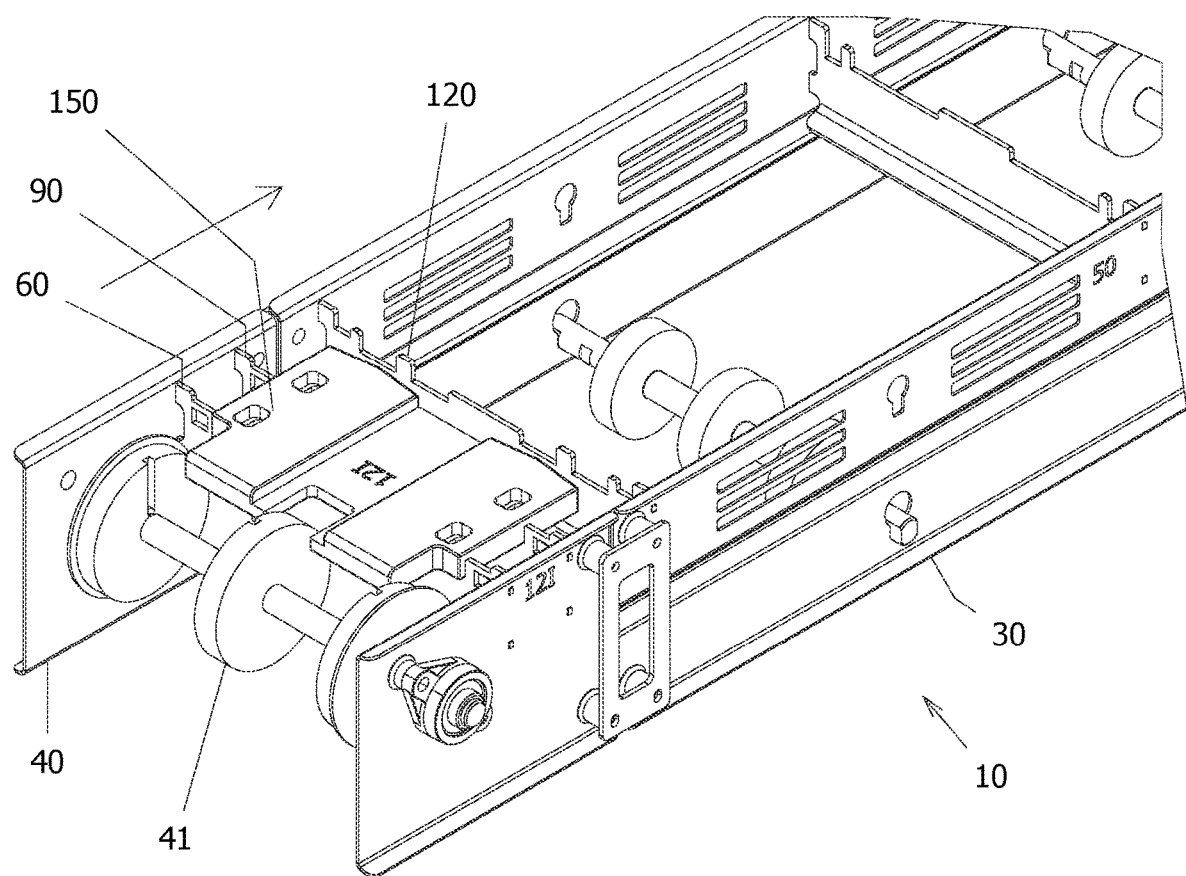
FIG. 5 is a similar to FIG. 4, but shows wear strips being longitudinally moved to an unlocked position.
Figure 6:
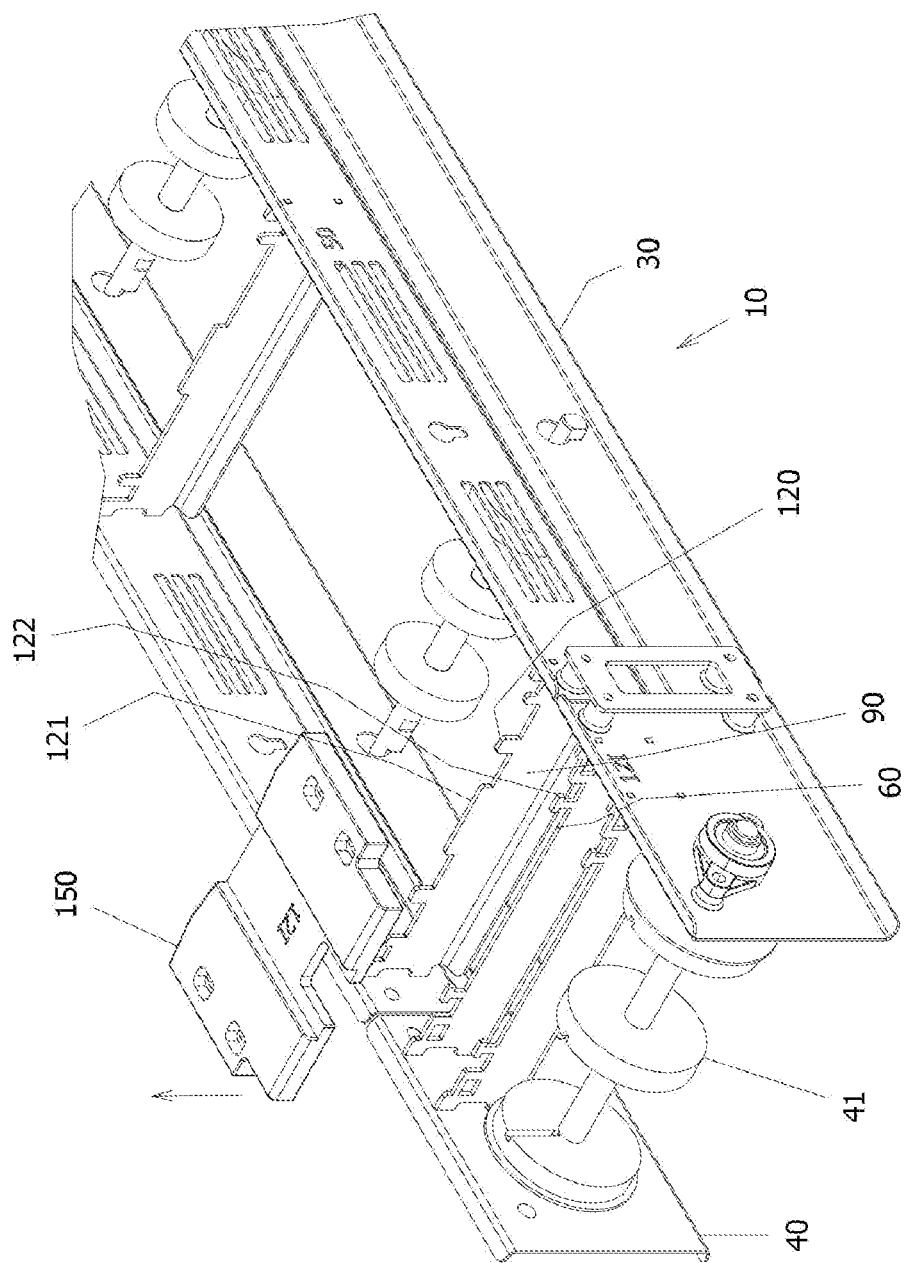
FIG. 6 is similar to FIG. 5, but shows the wear strips being removed.
Figure 7:
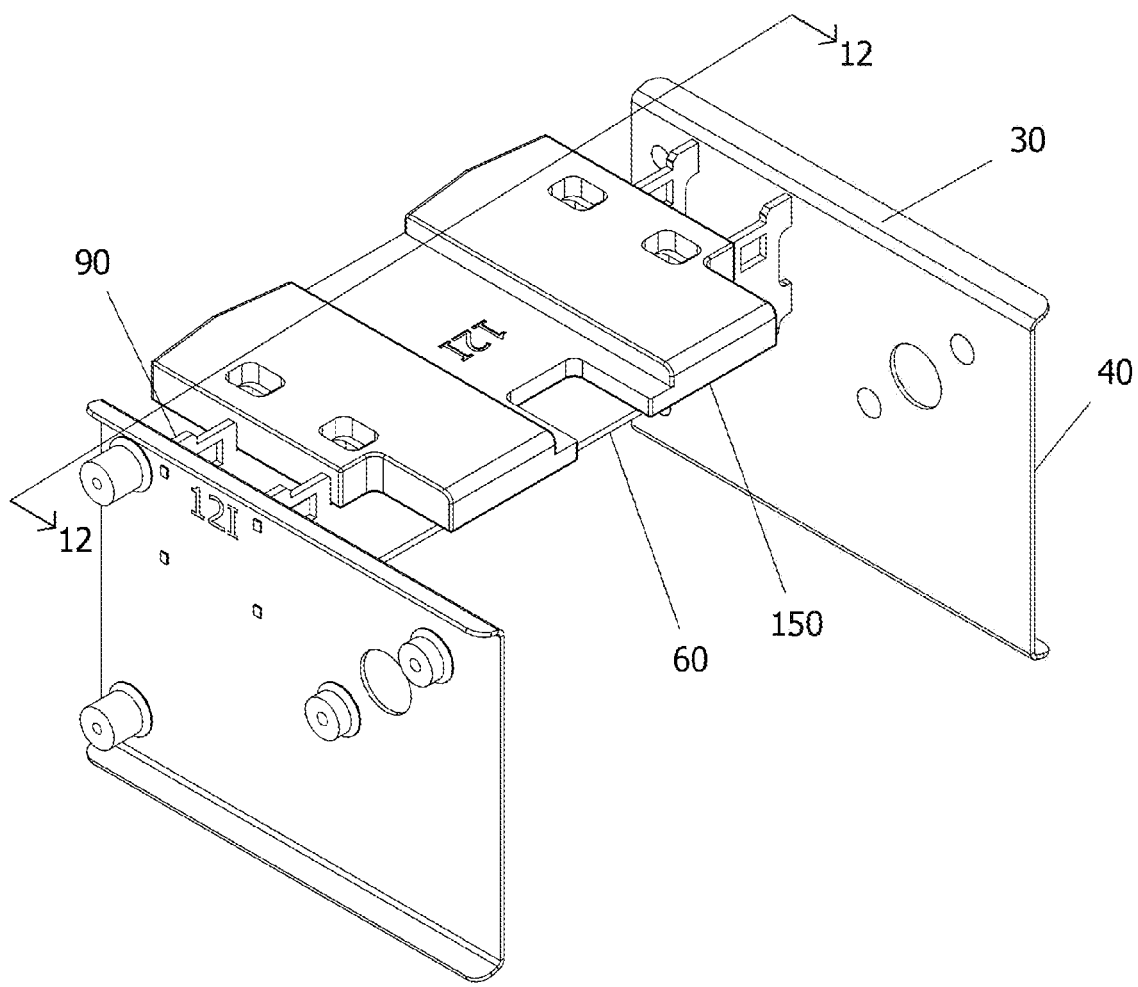
FIG. 7 is a perspective view showing the wear strips in a locked position.
Figure 8:
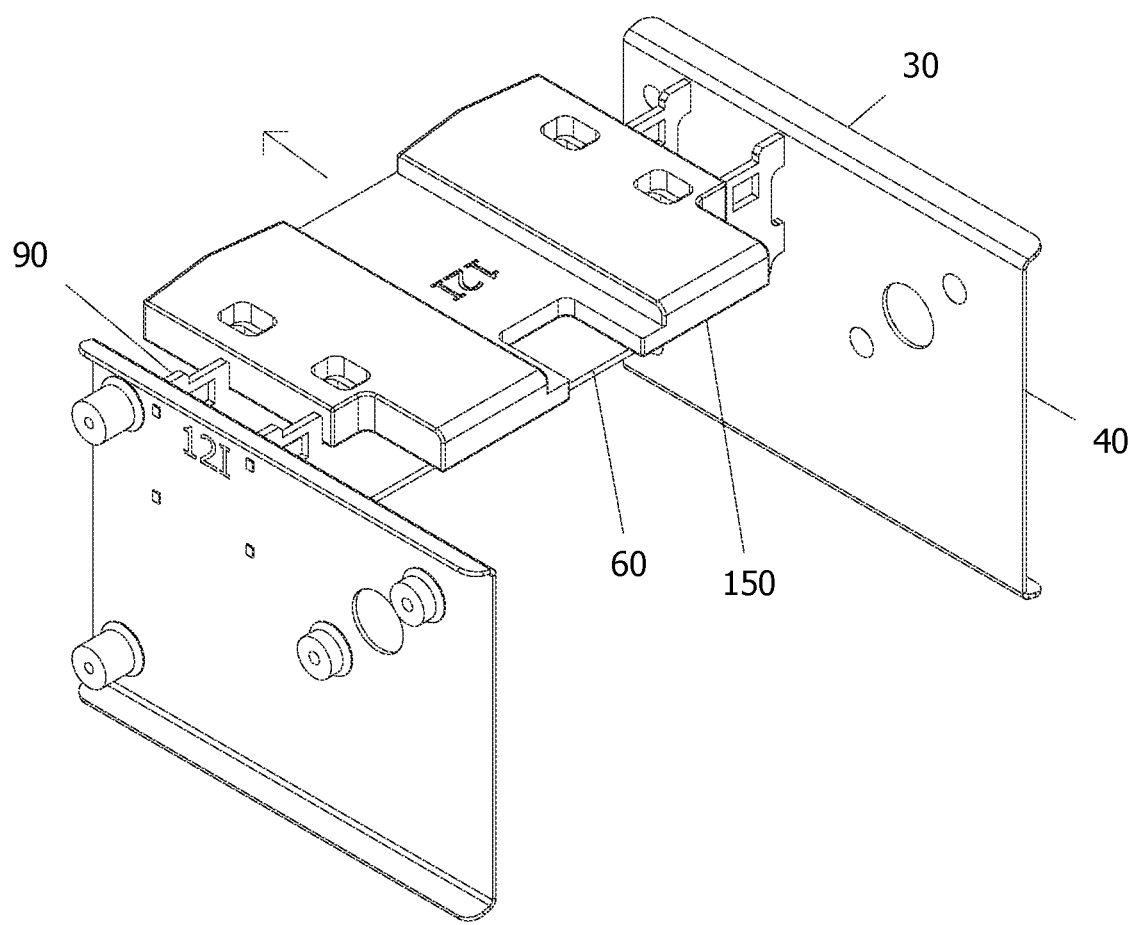
FIG. 8 is a perspective view showing the wear strip moved relative to the locks so that the wear strip can be removed.
Figure 9:
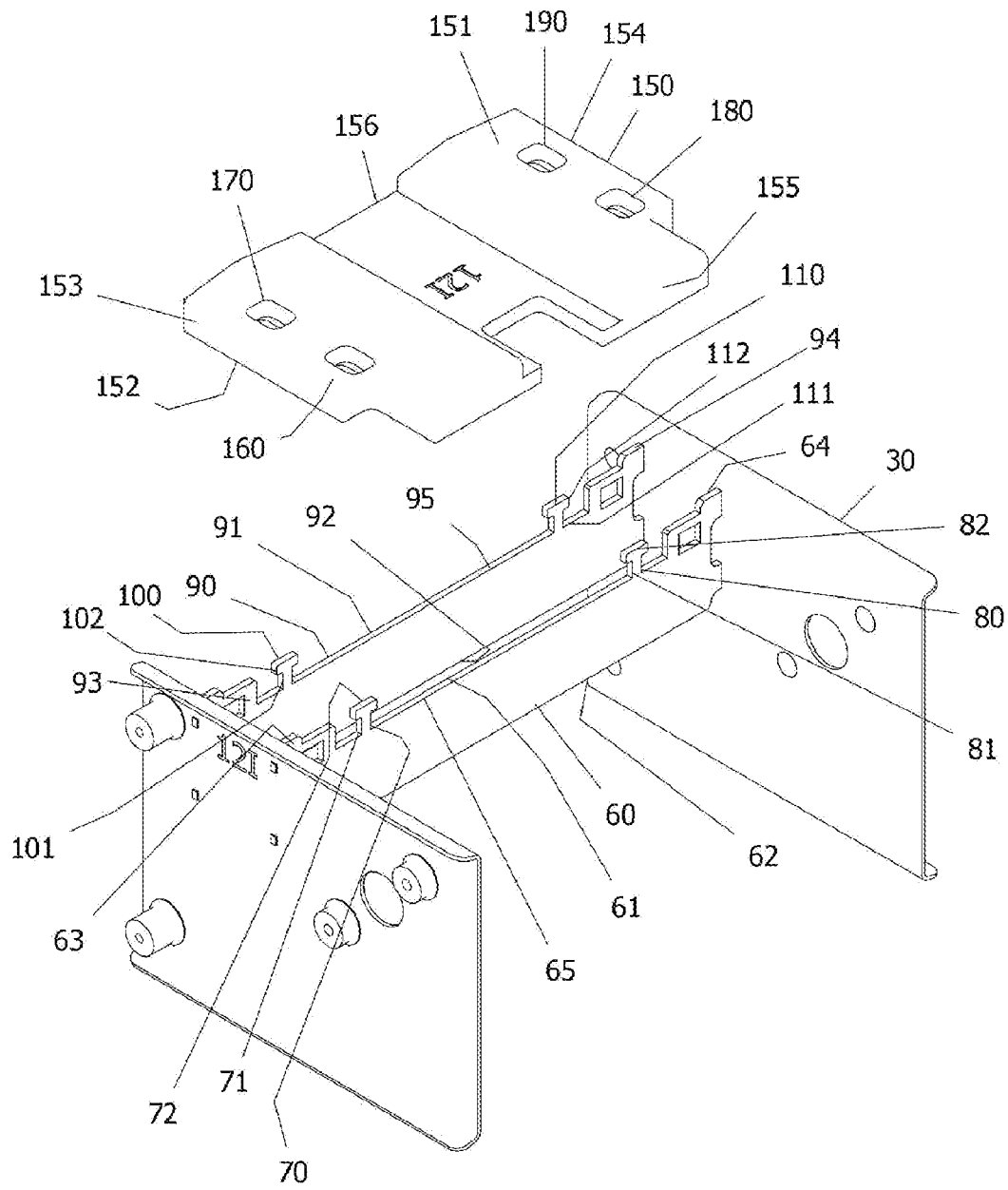
FIG. 9 is an exploded view showing the wear strip and frame spacers.
Figure 10:
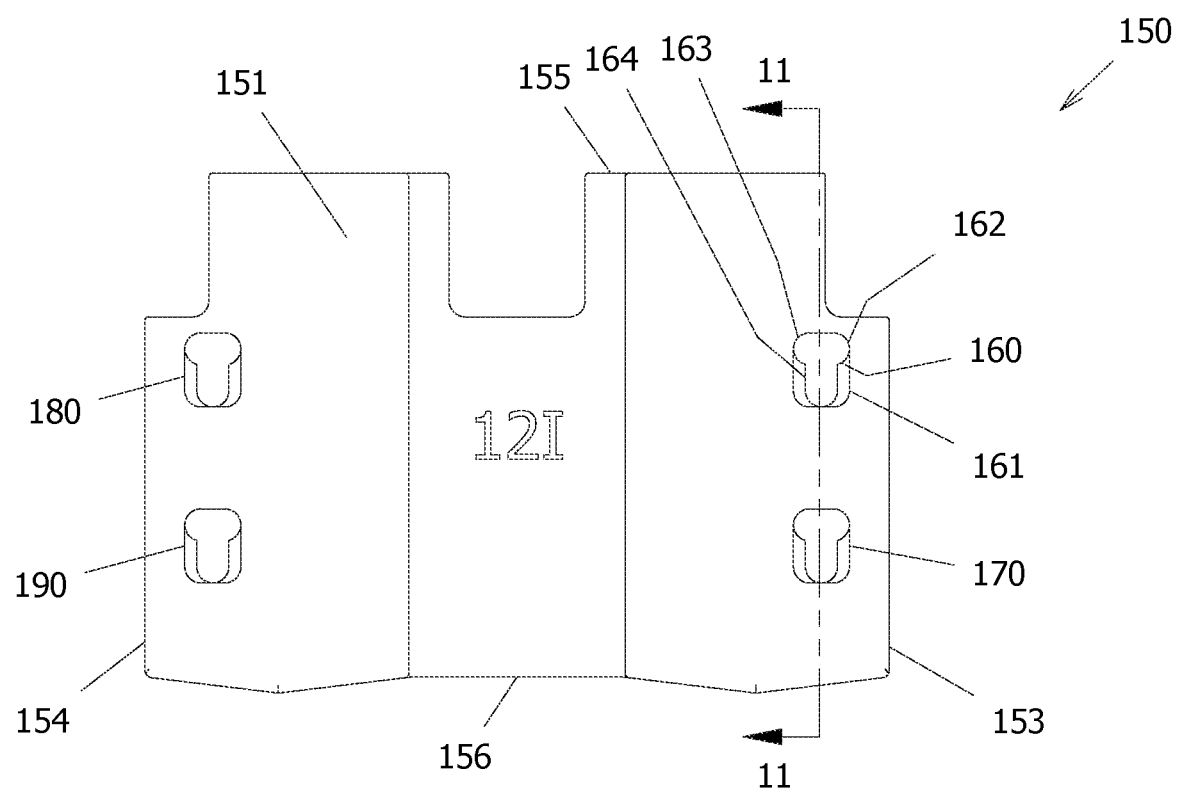
FIG. 10 is a bottom view of a wear strip.
Figure 11:
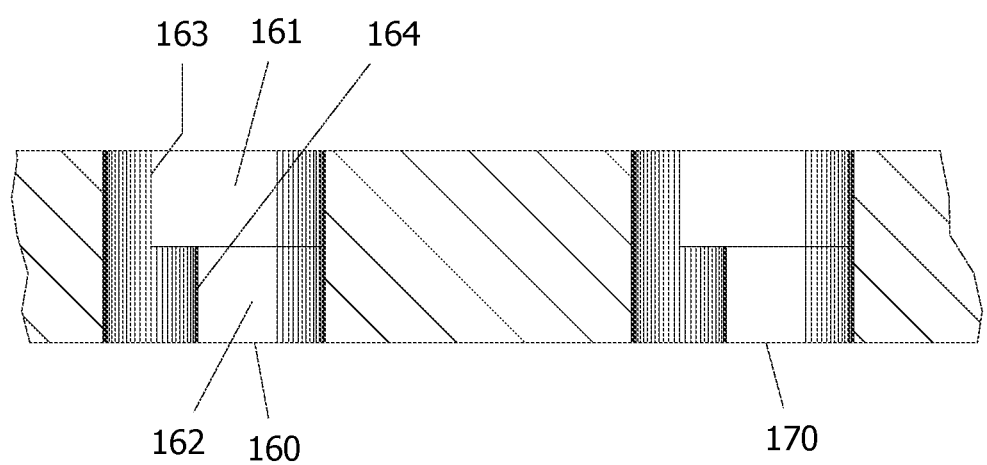
FIG. 11 is a cross-sectional view taken along line 11-11 in FIG. 10.
Figure 12:
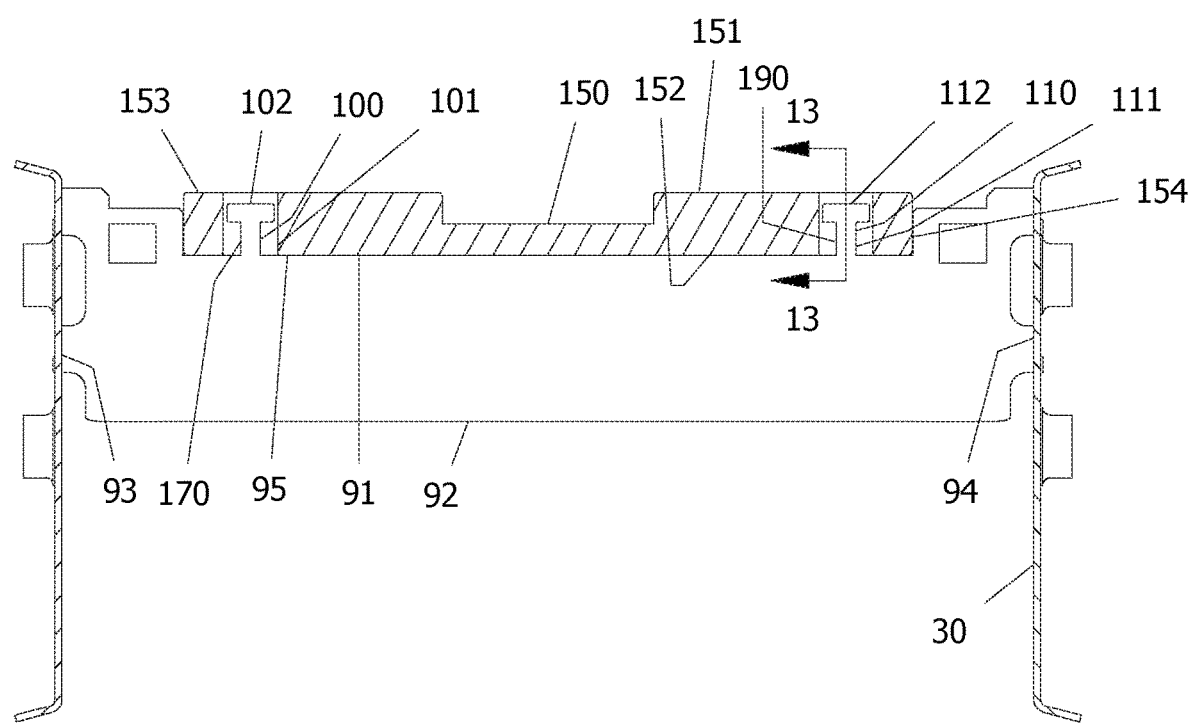
FIG. 12 is a cross-sectional view taken along line 12-12 in FIG. 7.
Figure 13:
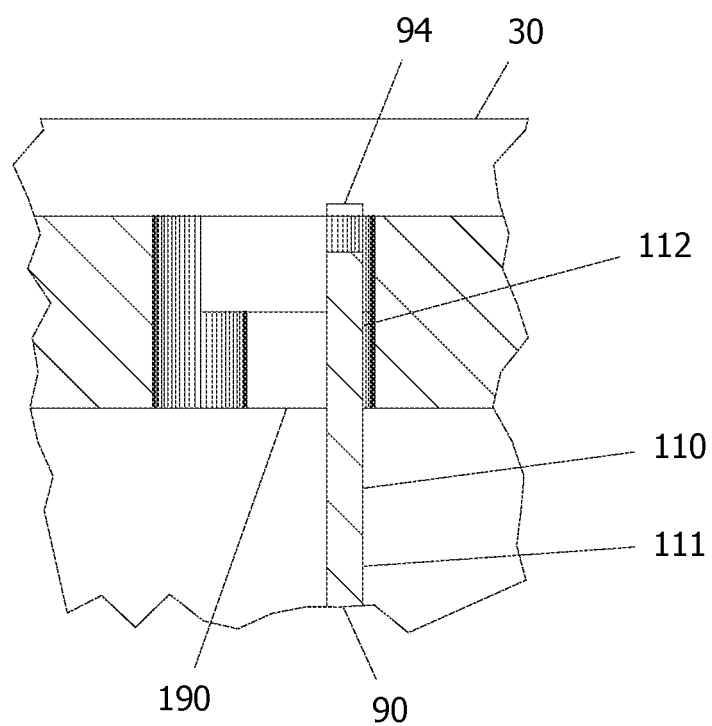
FIG. 13 is a cross-sectional view taken along line 13-13 in FIG. 12.
Figure 14:
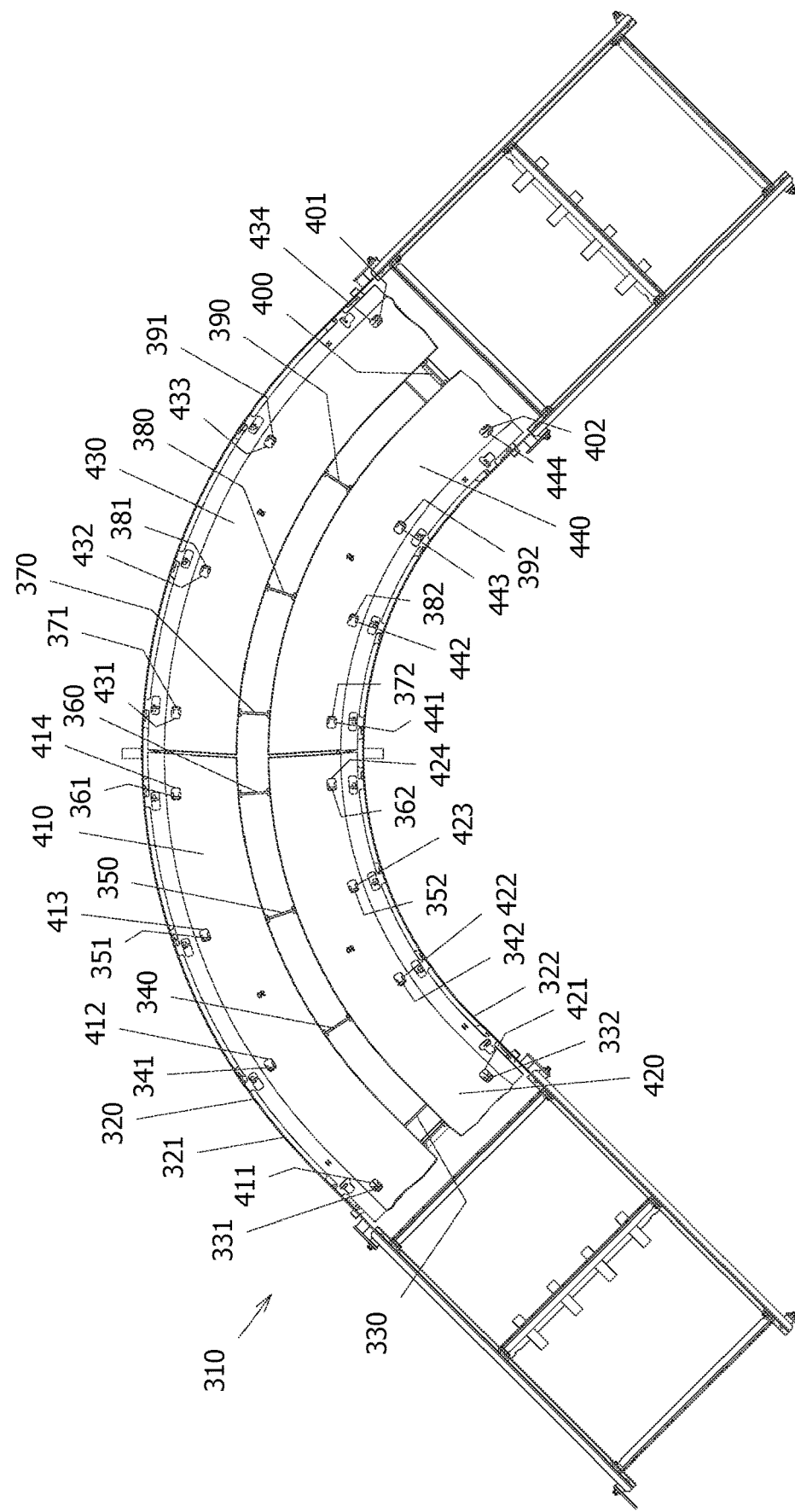
FIG. 14 is a top view of an additional embodiment of the present invention with wear strips shown in a locked position.
Figure 15:
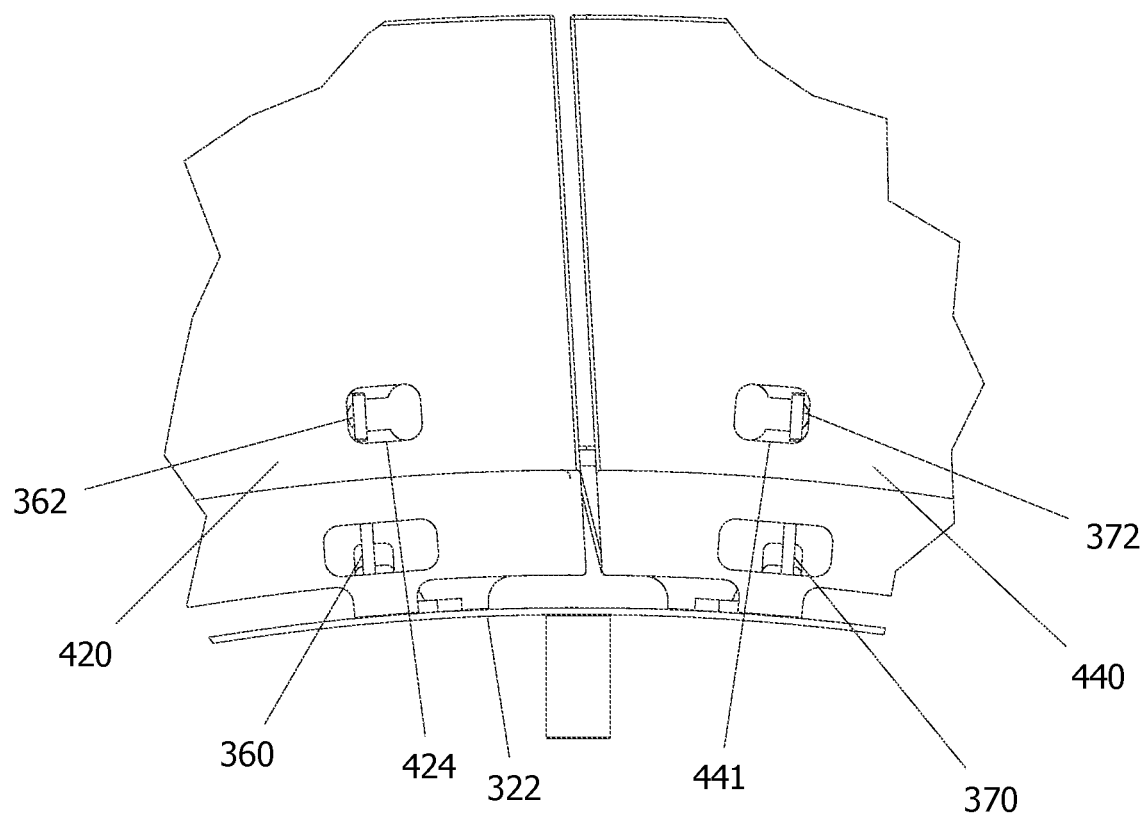
FIG. 15 is a close-up view of a portion of the embodiment illustrated in FIG. 14.
Figure 16:
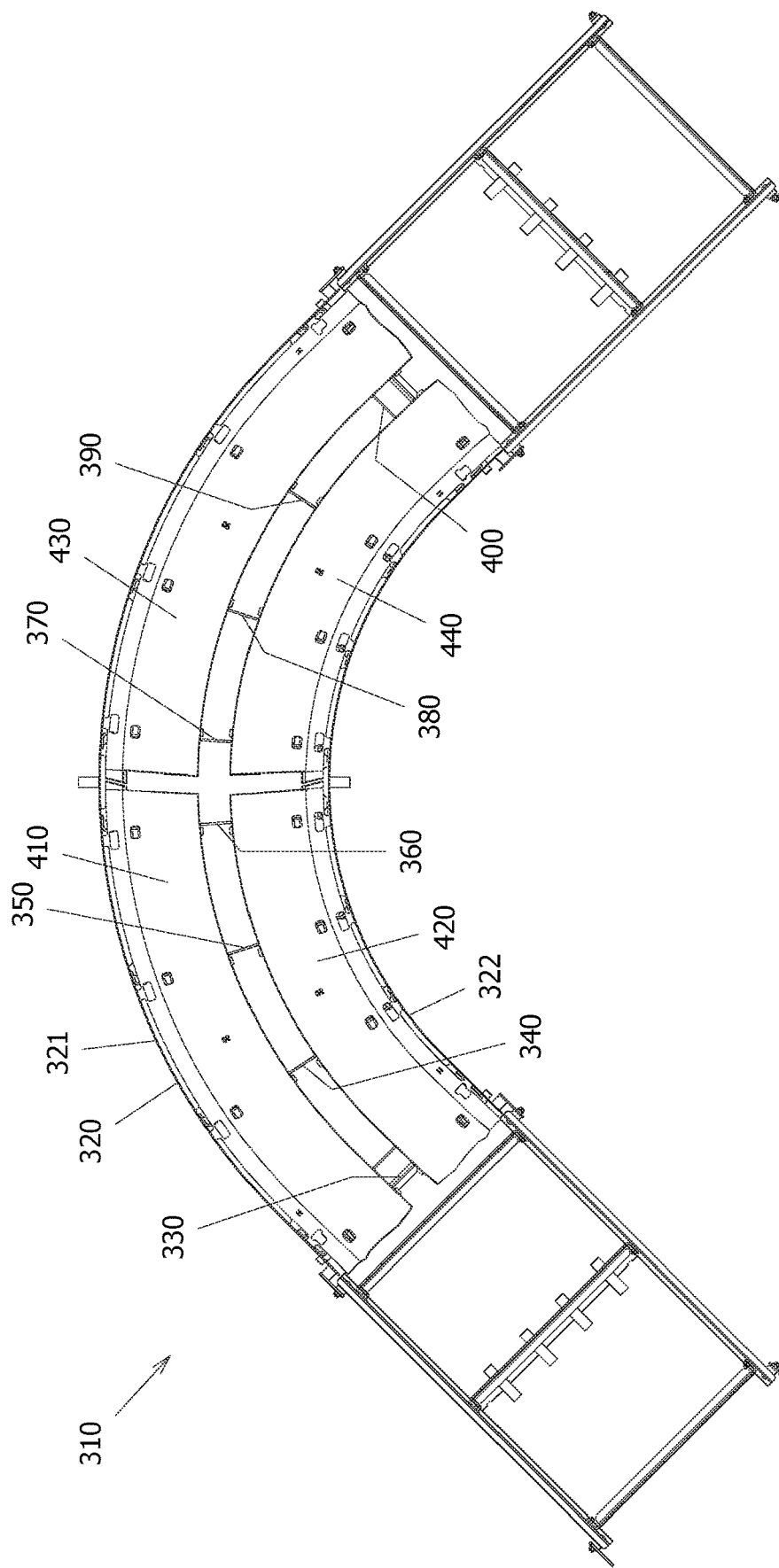
FIG. 16 is similar to FIG. 14, but shows the wear strips in an unlocked position.
Figure 17:
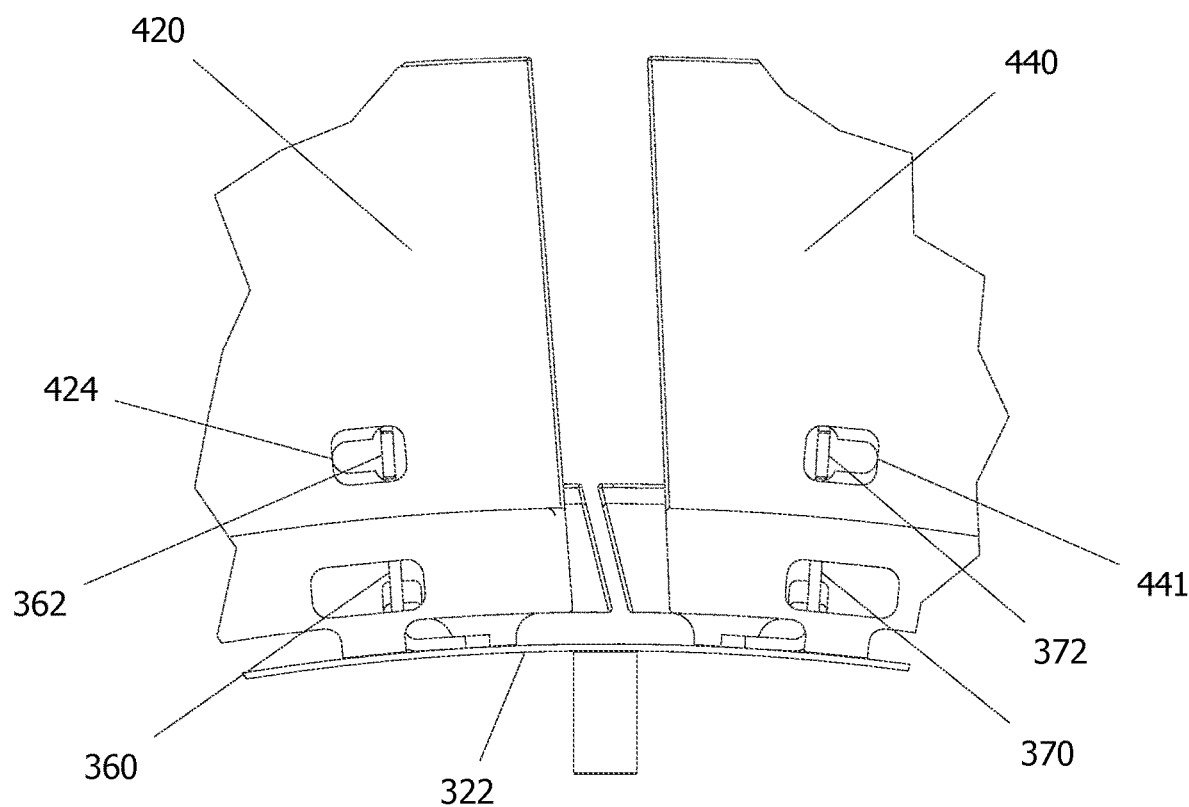
FIG. 17 is a close-up view of a portion of the embodiment illustrated in FIG. 16.
Figure 18:
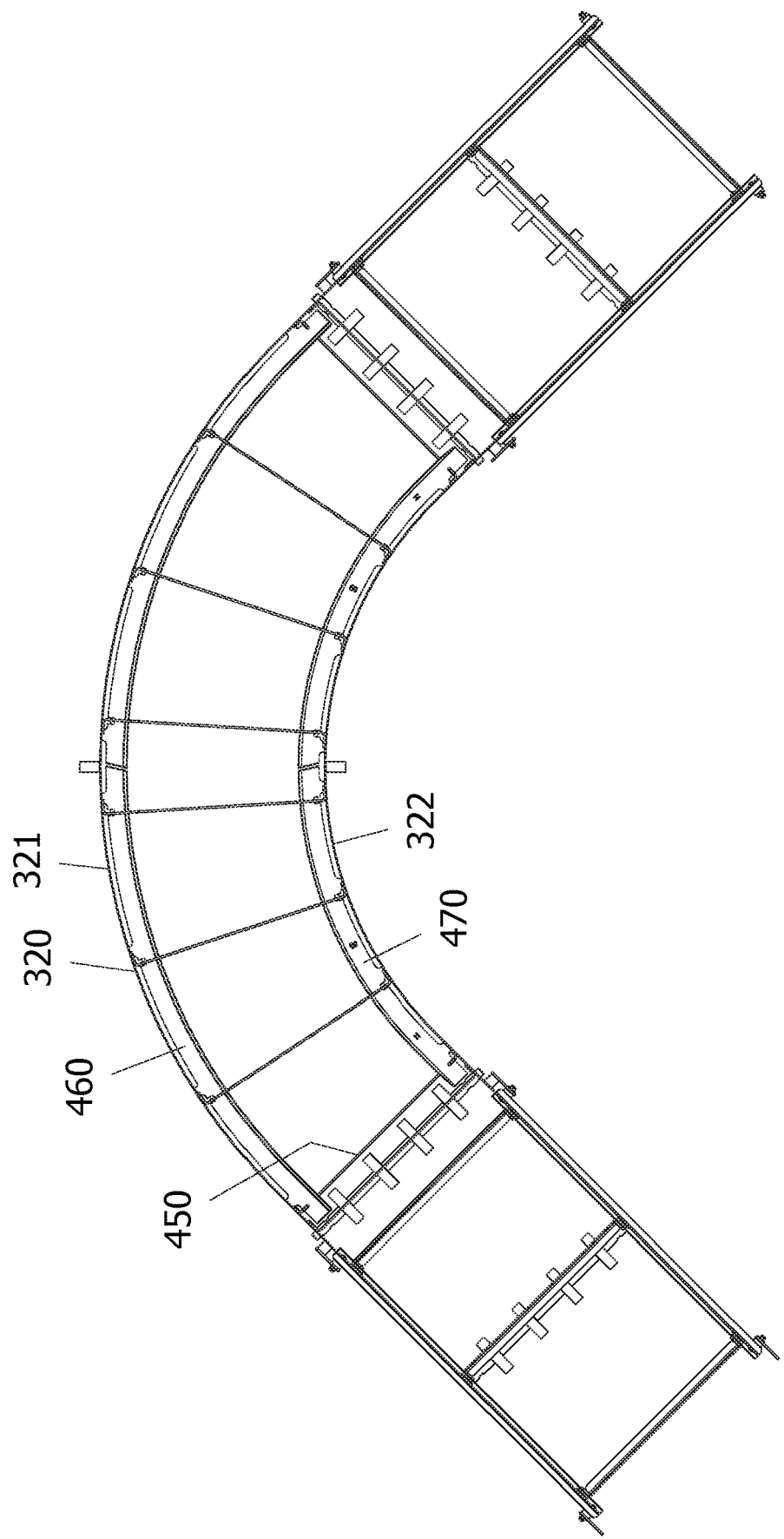
FIG. 18 is a bottom view of the embodiment illustrated in FIG. 14 showing lower guides in locked positions.
Figure 19:
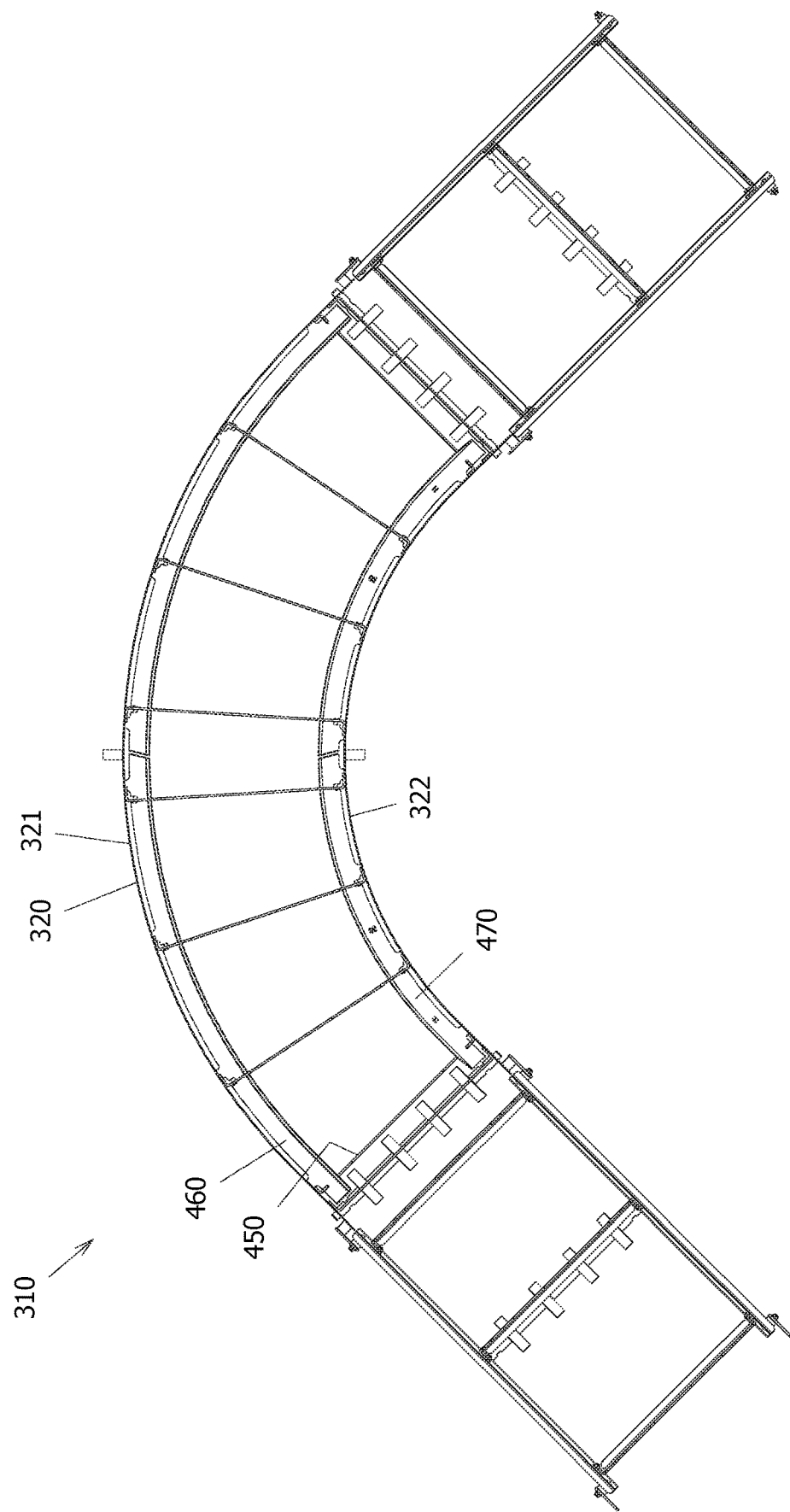
FIG. 19 is similar to FIG. 18, but shows the lower guides in unlocked positions.
Figure 20:
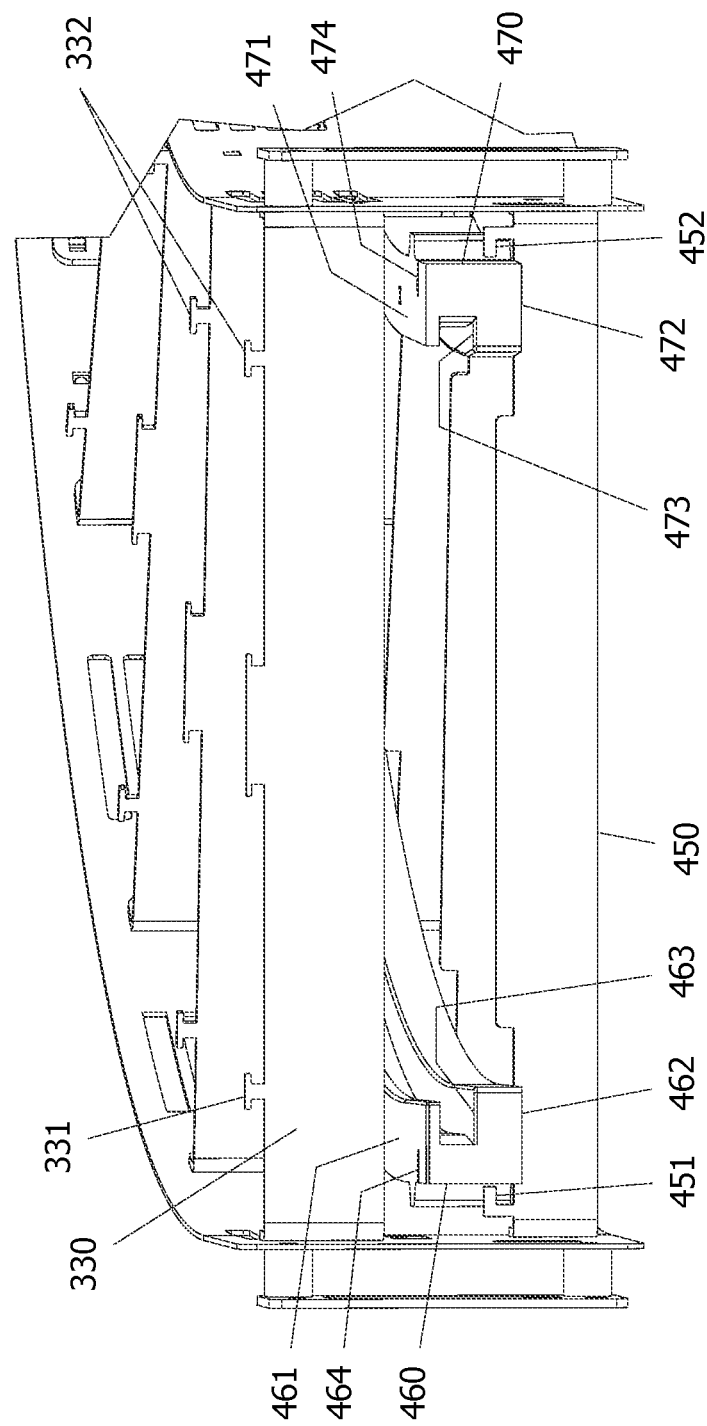
FIG. 20 is a perspective view showing the lower guides in unlocked positions.
Figure 21:
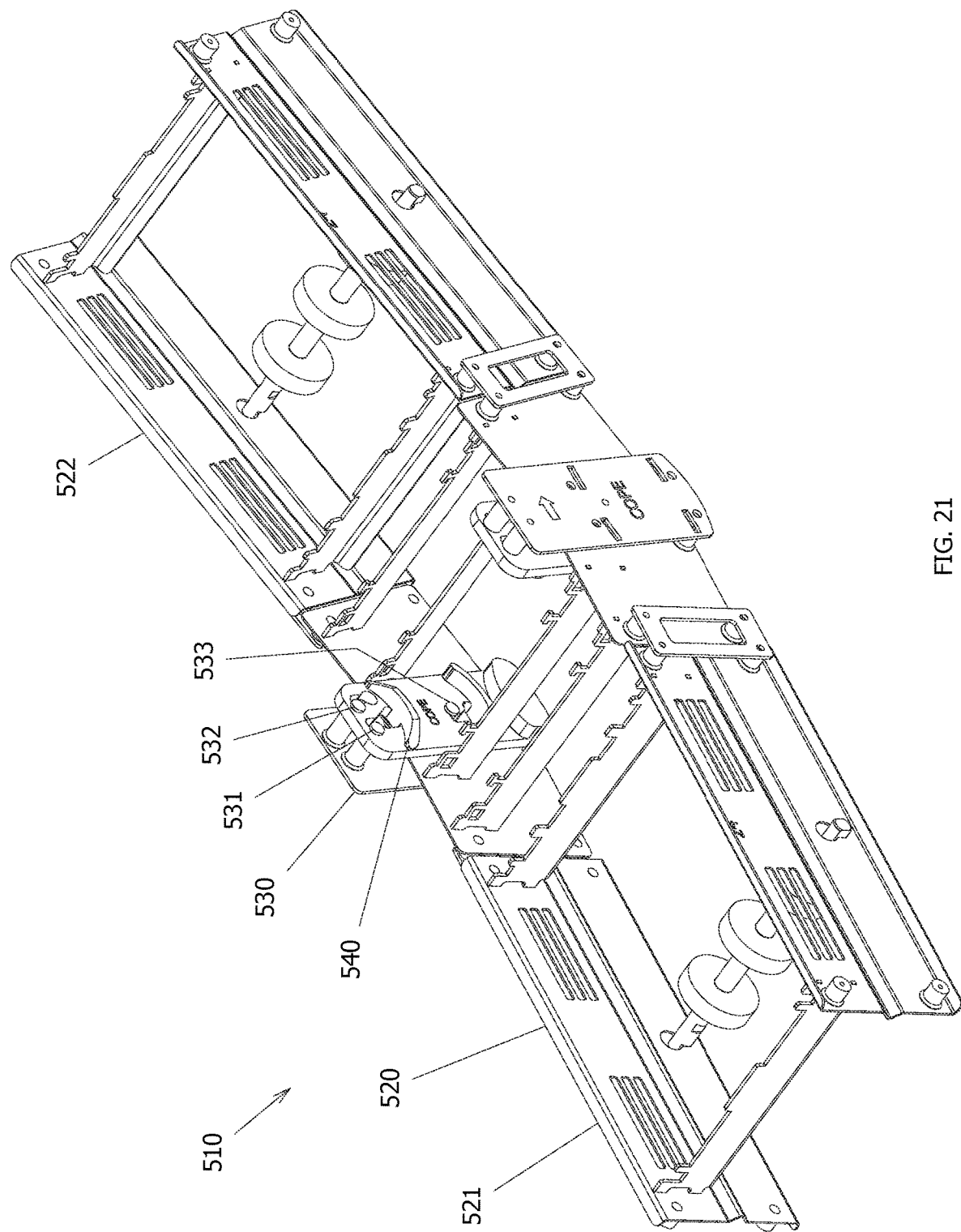
FIG. 21 is a perspective view of an additional embodiment of the present invention showing a cope in a locked position.
Figure 22:
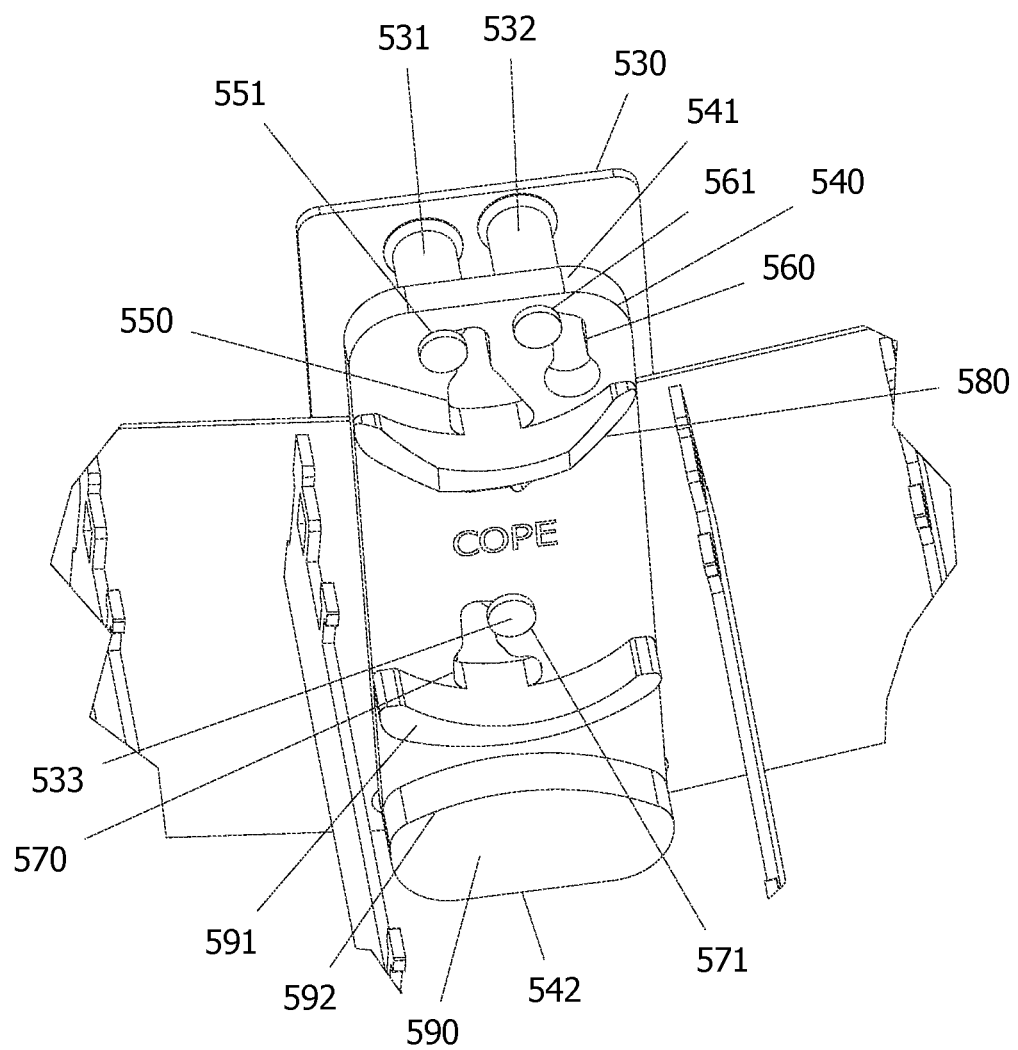
FIG. 22 is an isolation perspective view of the cope shown in FIG. 21.
Figure 23:
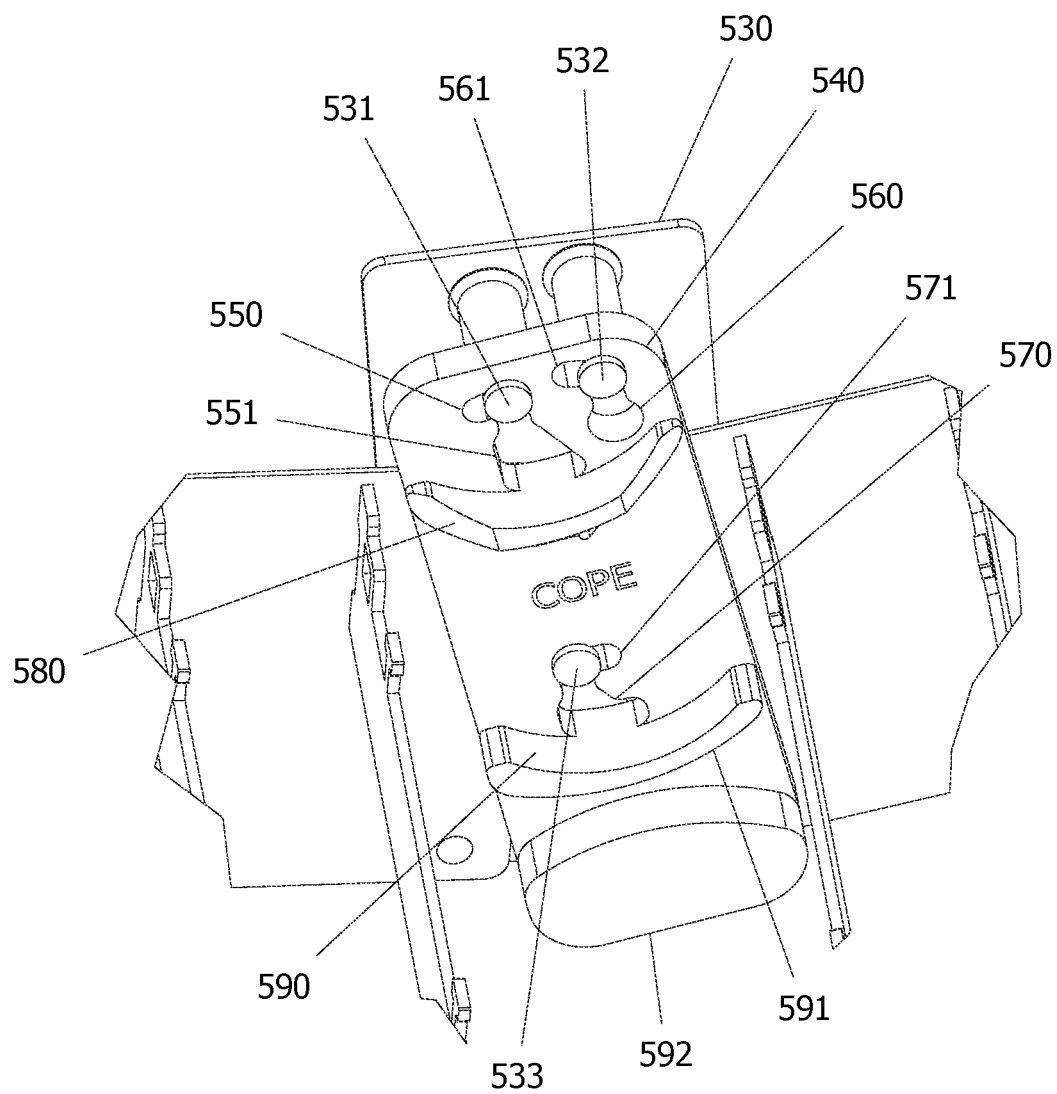
FIG. 23 is similar to FIG. 22, but shows the cope being unlocked by rotation.
Figure 24:
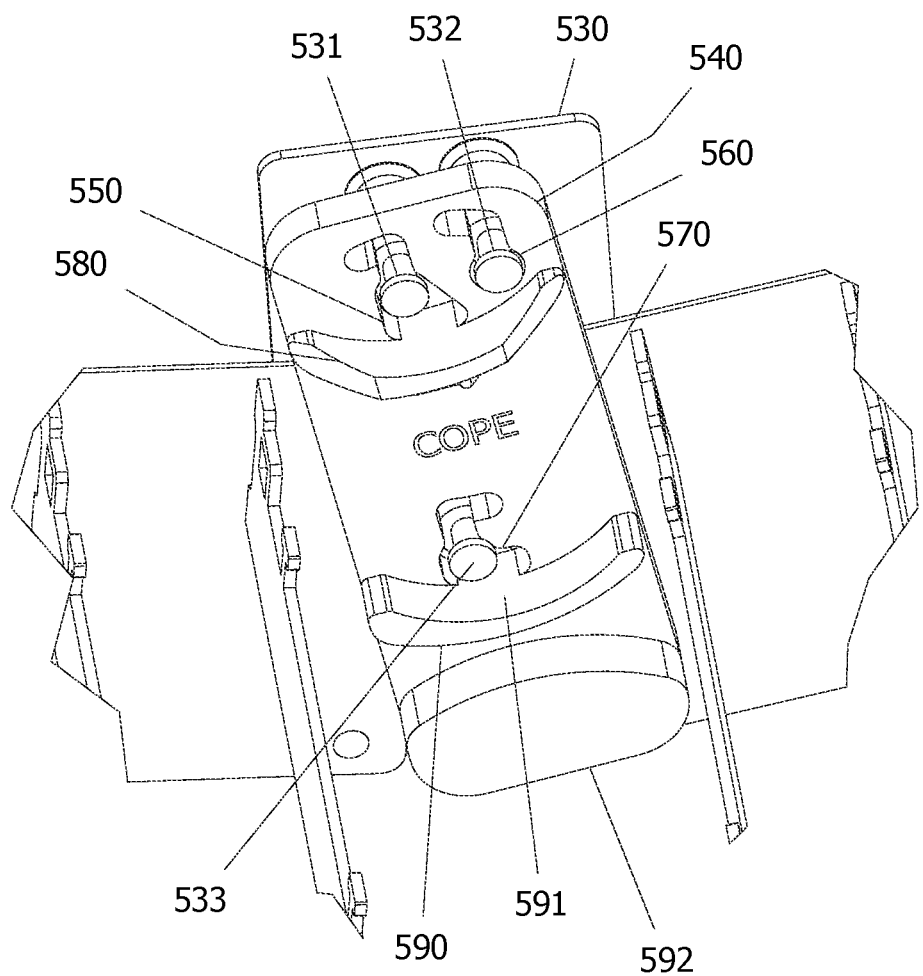
FIG. 24 is similar to FIG. 22, but shows the cope in an unlocked position.
Figure 25:
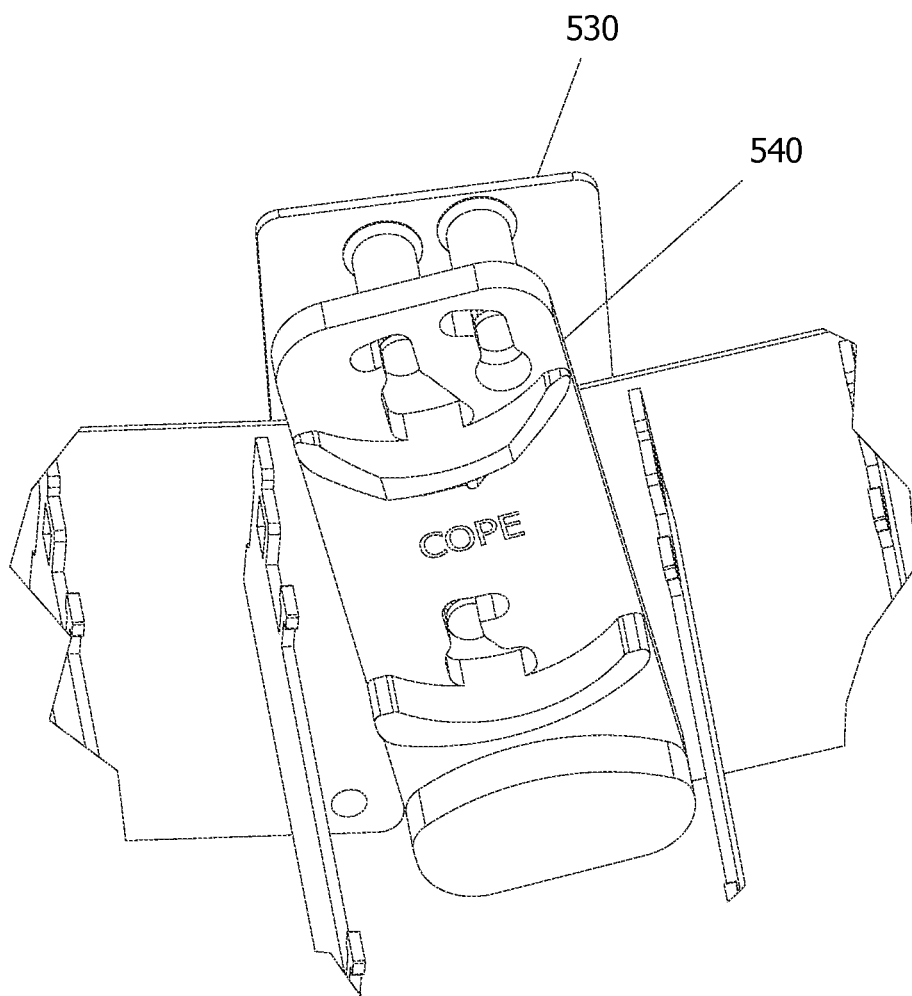
FIG. 25 is similar to FIG. 24, but shows the cope removed from the pegs of the joint.
Figure 26:
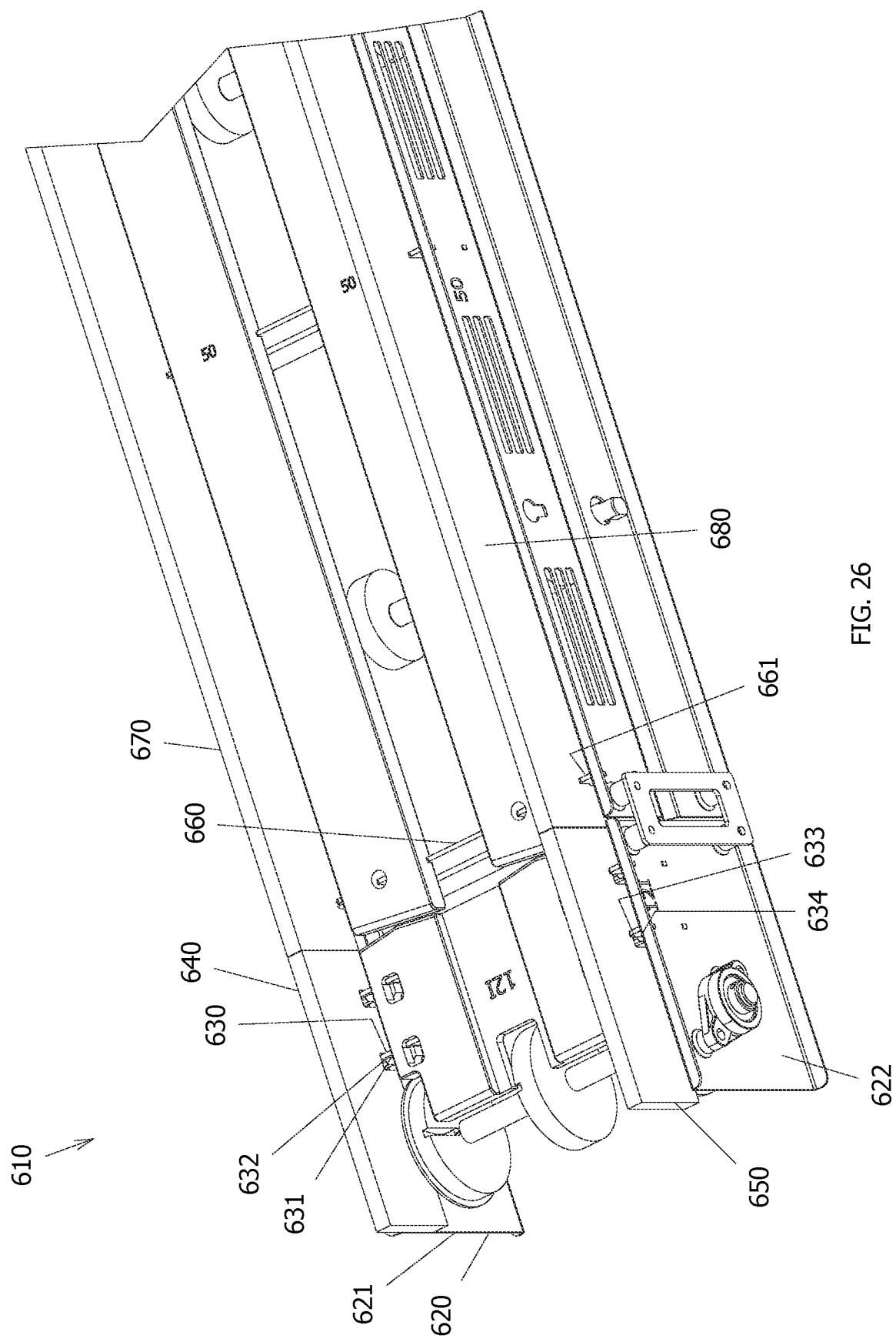
FIG. 26 is a perspective view showing an additional embodiment of the present invention.
Figure 27:
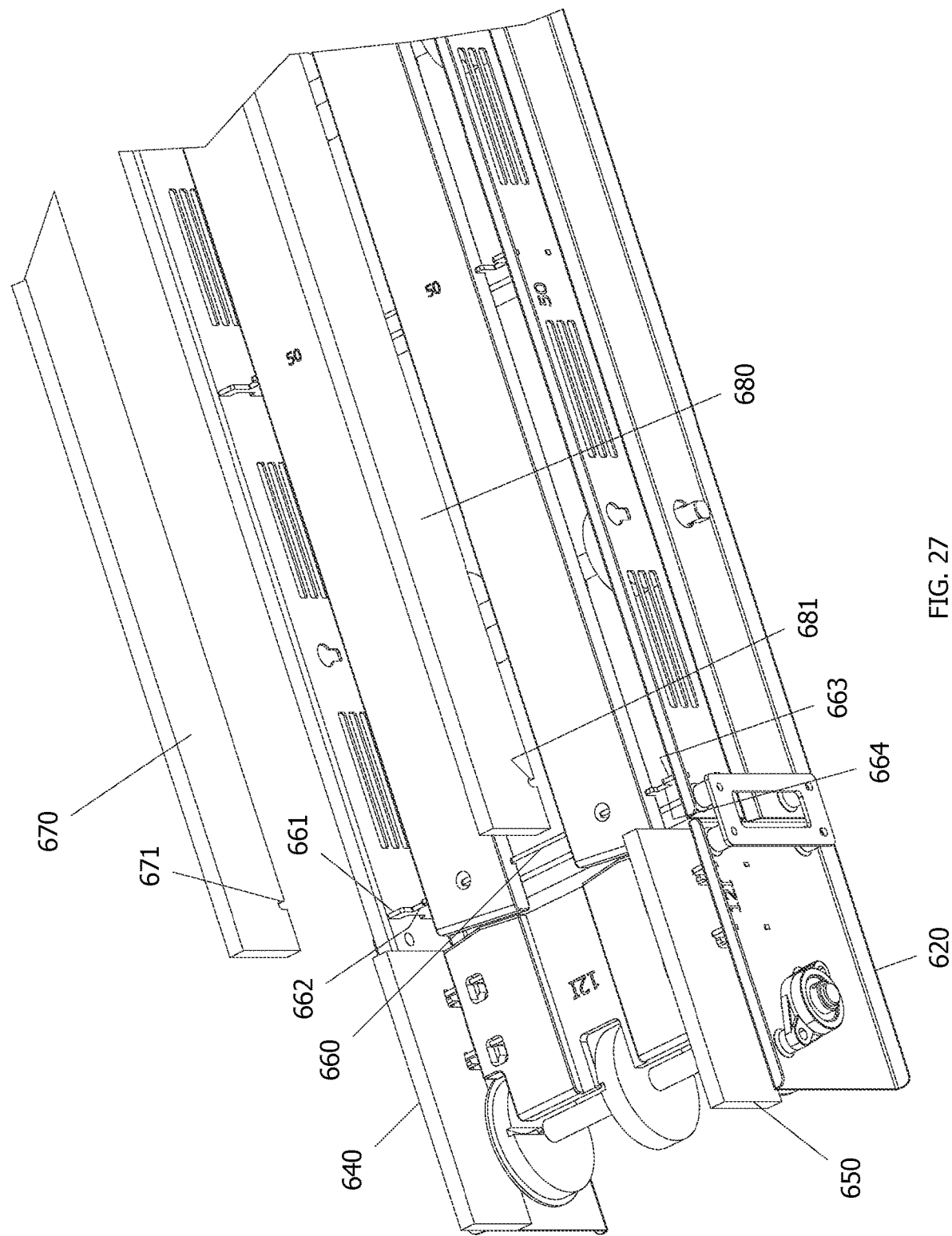
FIG. 27 is similar to FIG. 26, but shows the side strips in an exploded view.
Figure 28:
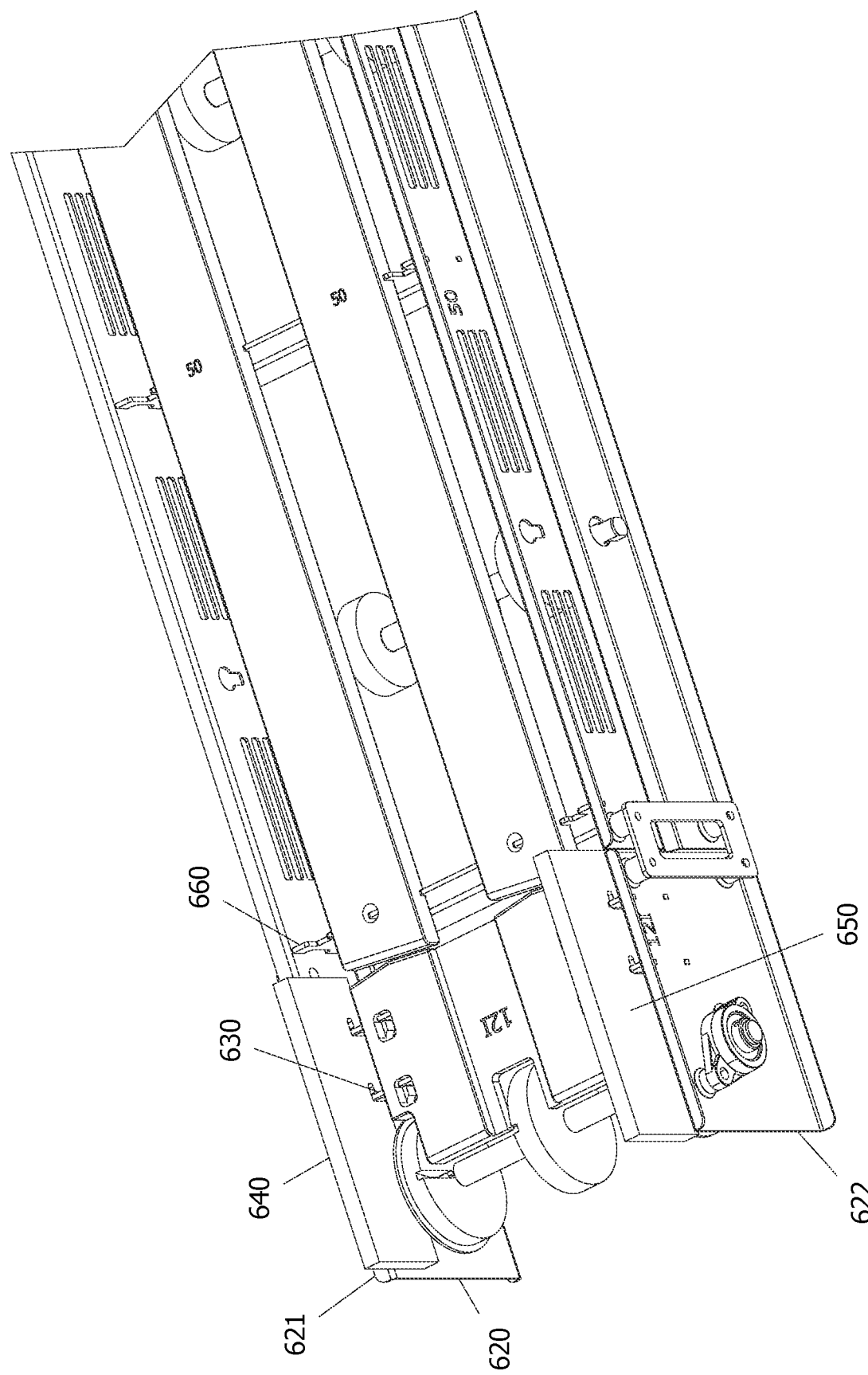
FIG. 28 is similar to FIG. 27, but shows the side strips removed.
Figure 29:
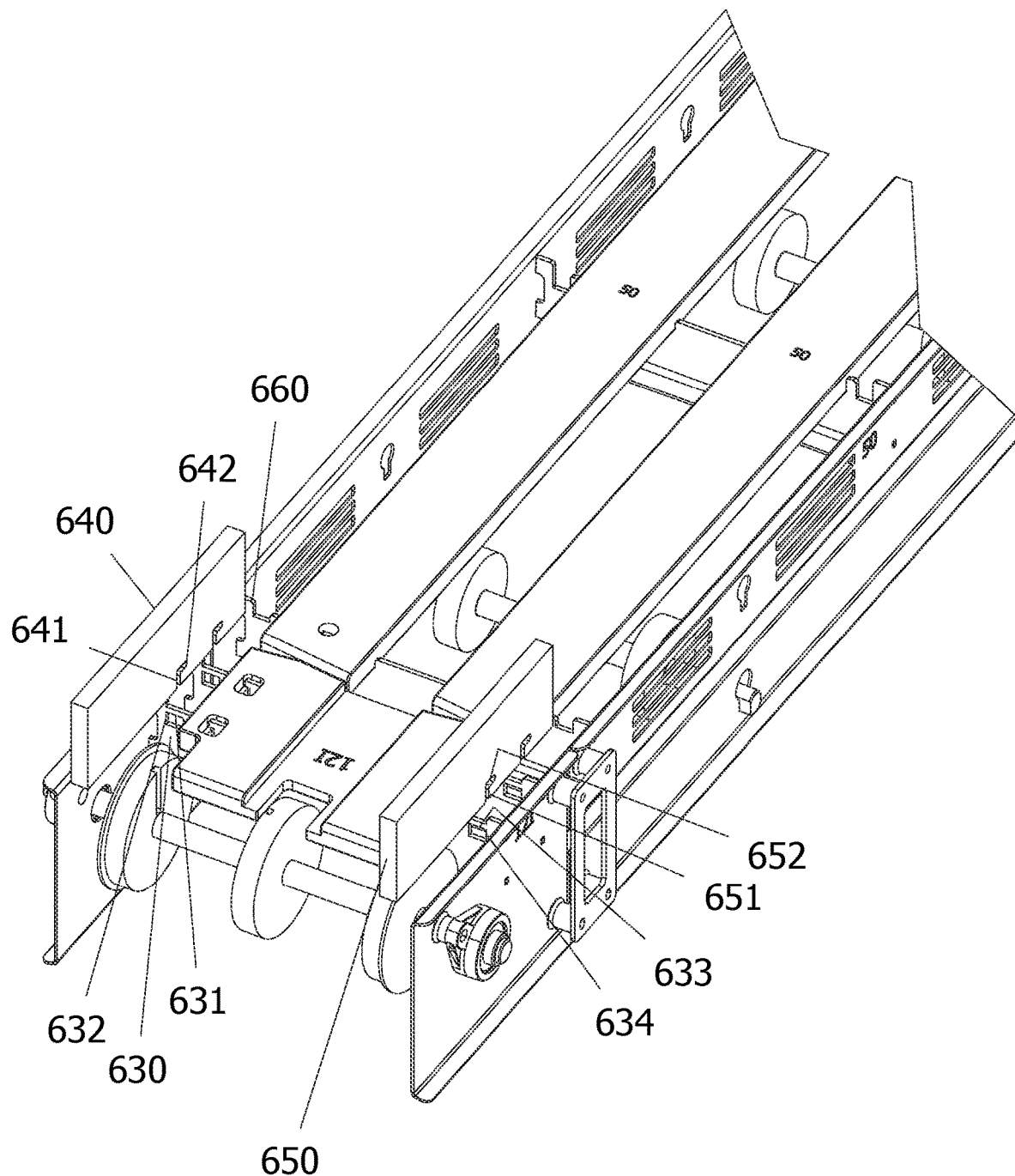
FIG. 29 is similar to FIG. 28, but shows the end strips in an exploded view.
Figure 30:
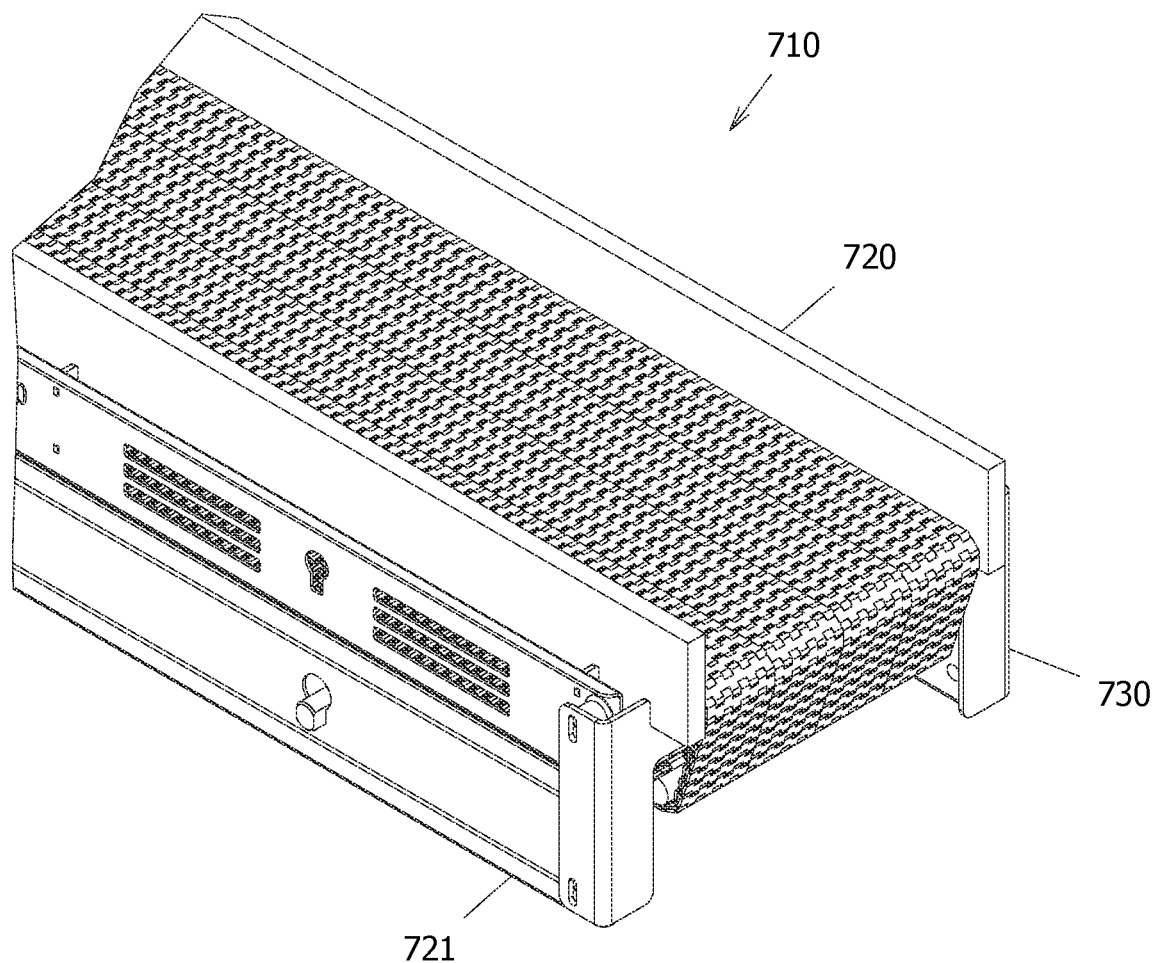
FIG. 30 is a perspective view of an alternative embodiment of the present invention.
Figure 31:
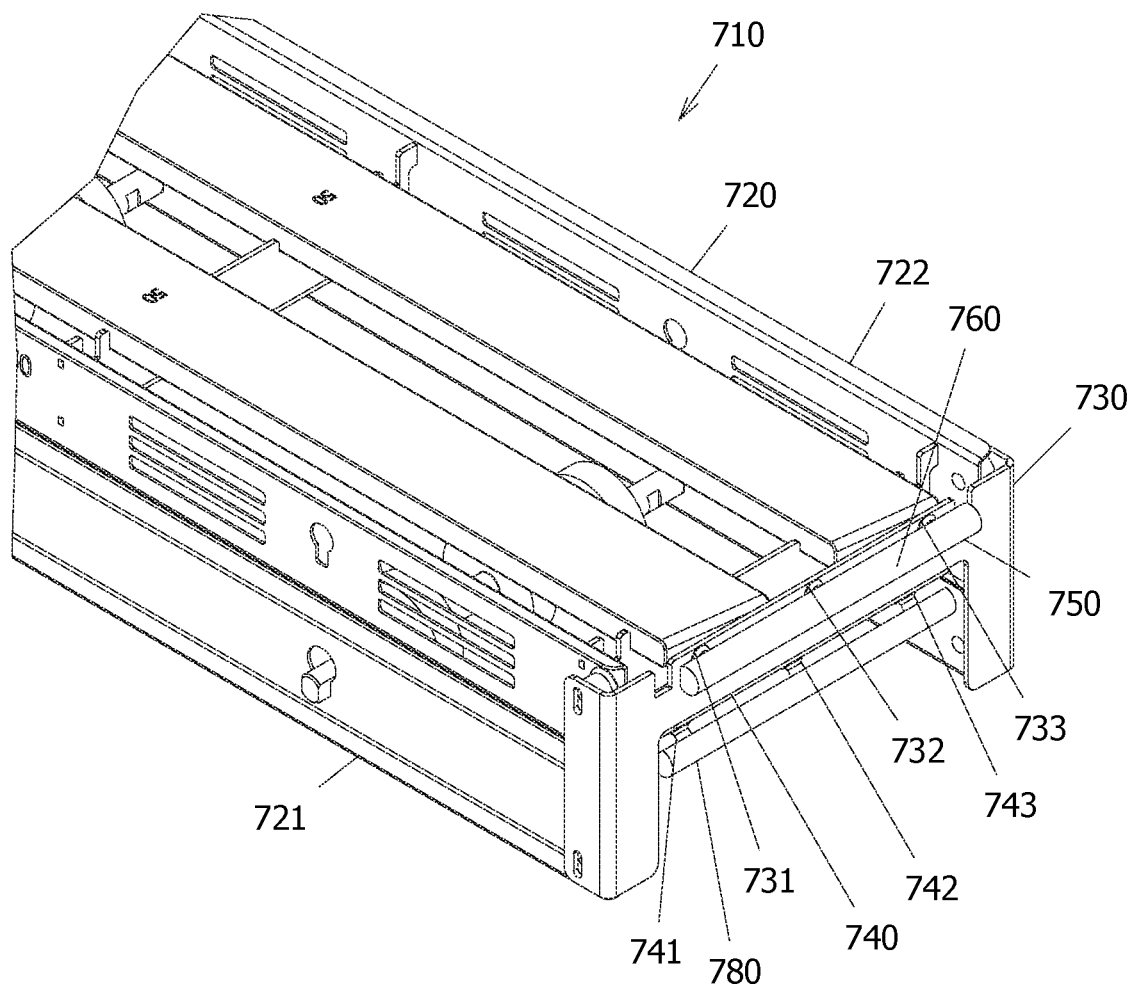
FIG. 31 is similar to FIG. 30, but shows the belt removed to reveal two nosers.
Figure 32:
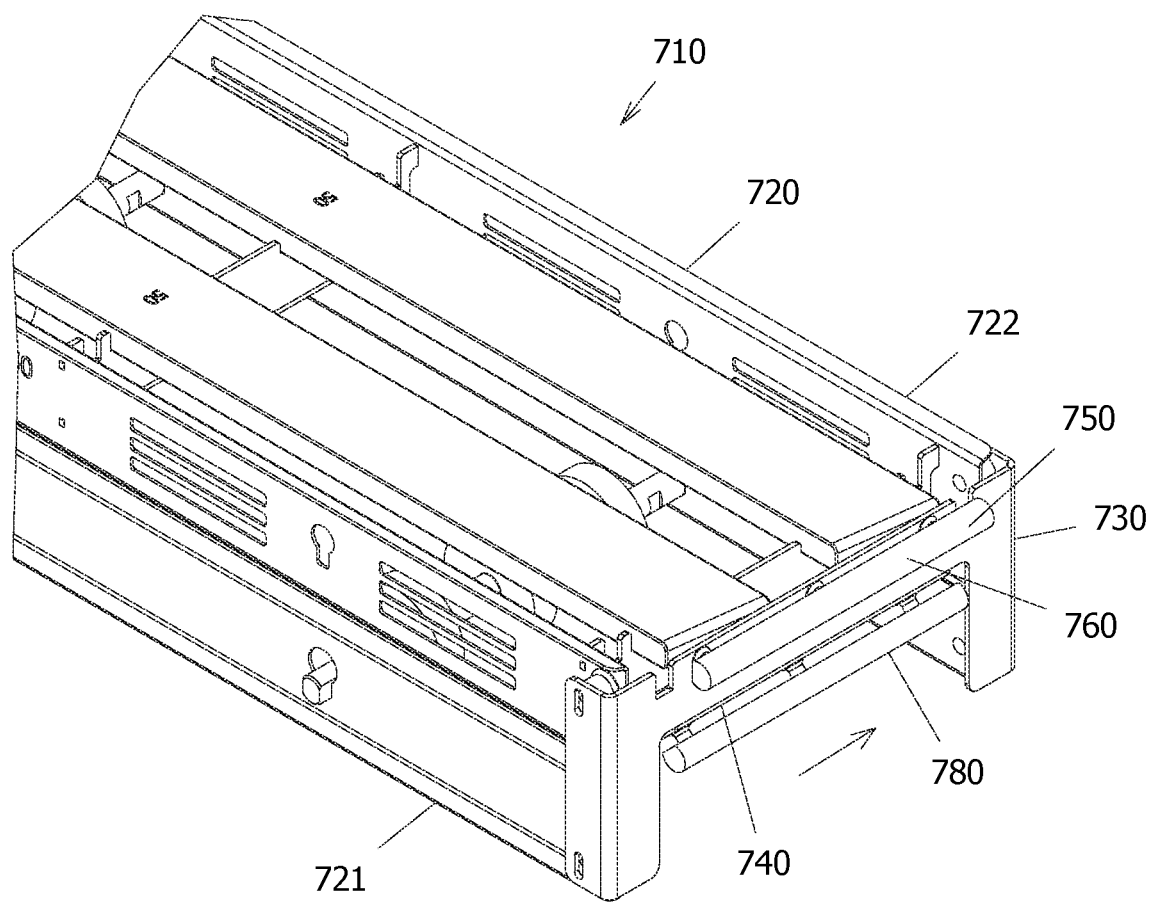
FIG. 32 is similar to FIG. 31, but shows the top noser slid in one direction relative to an end frame spacer.
Figure 33:
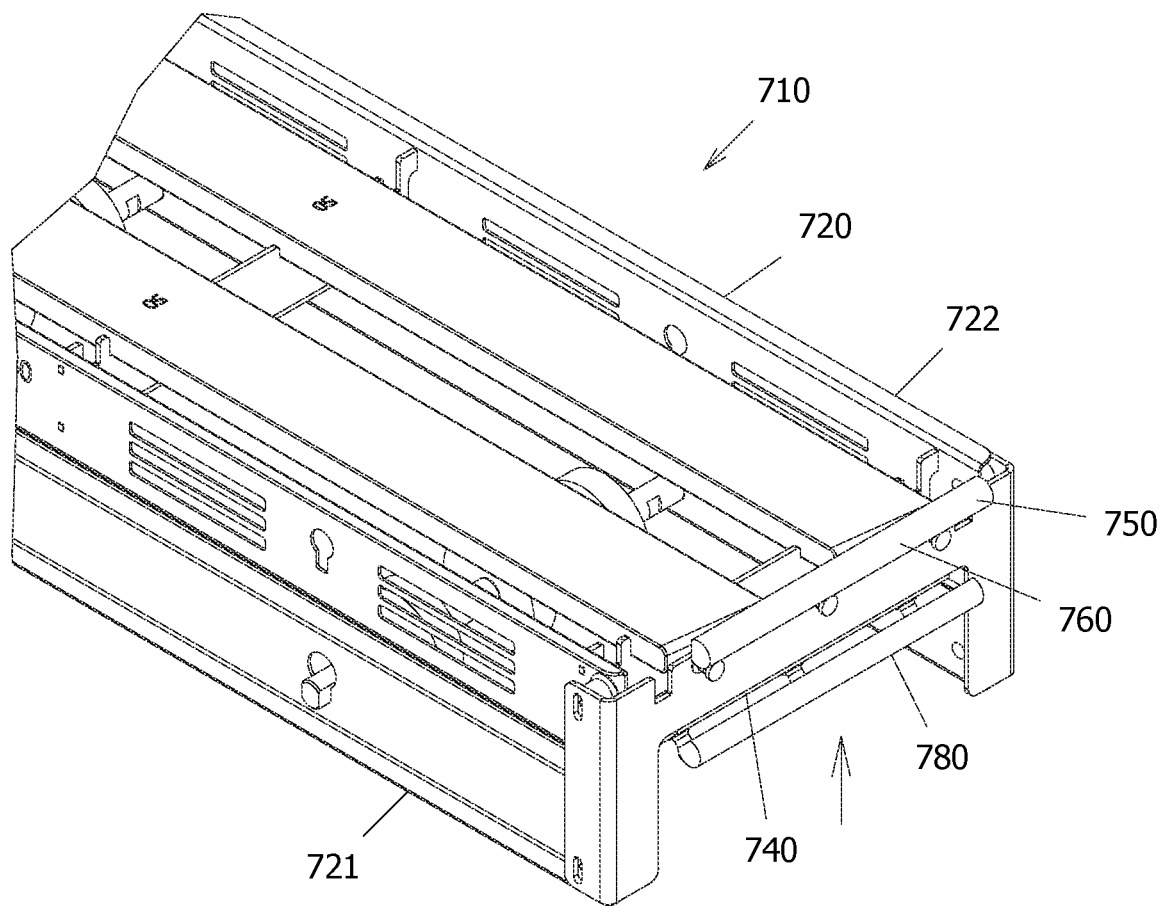
FIG. 33 is similar to FIG. 32, but shows the top noser slid vertically relative to the end frame spacer.
Figure 34:
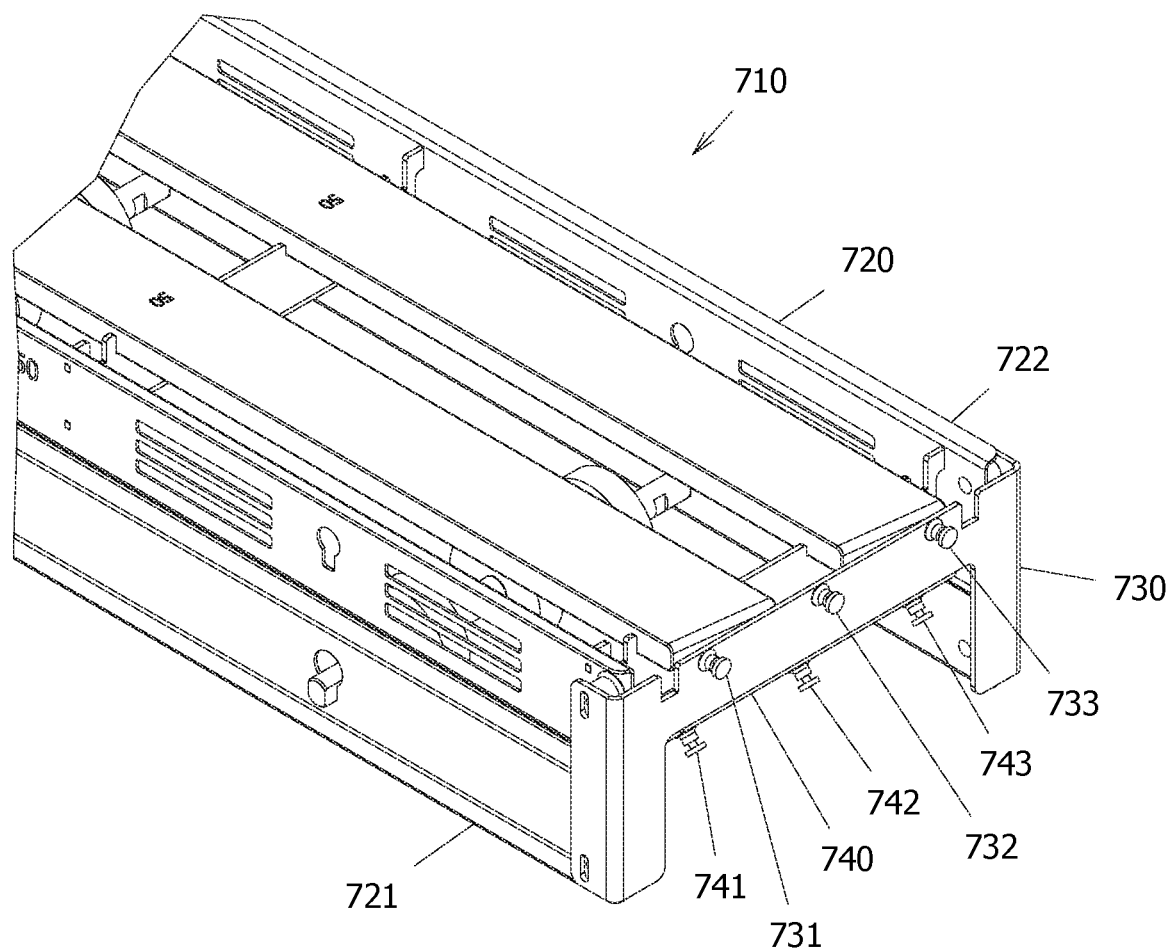
FIG. 34 is similar to FIG. 33, but shows the frame spacer without a noser.
Figure 35:
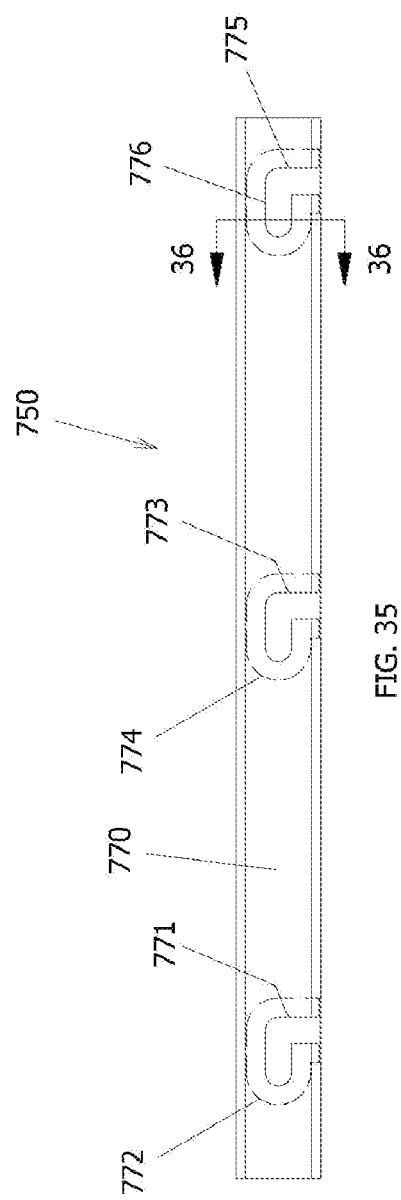
FIG. 35 is an isolation rear view of a noser.
Figure 36:
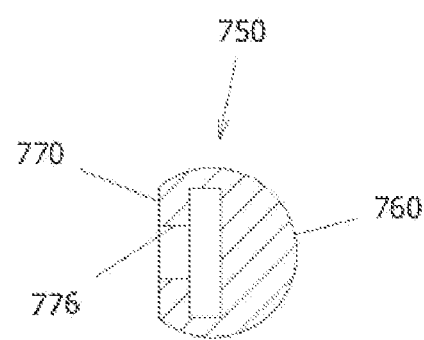
FIG. 36 is a cross-sectional view taken along line 36-36 in FIG. 35.
Figure 37:
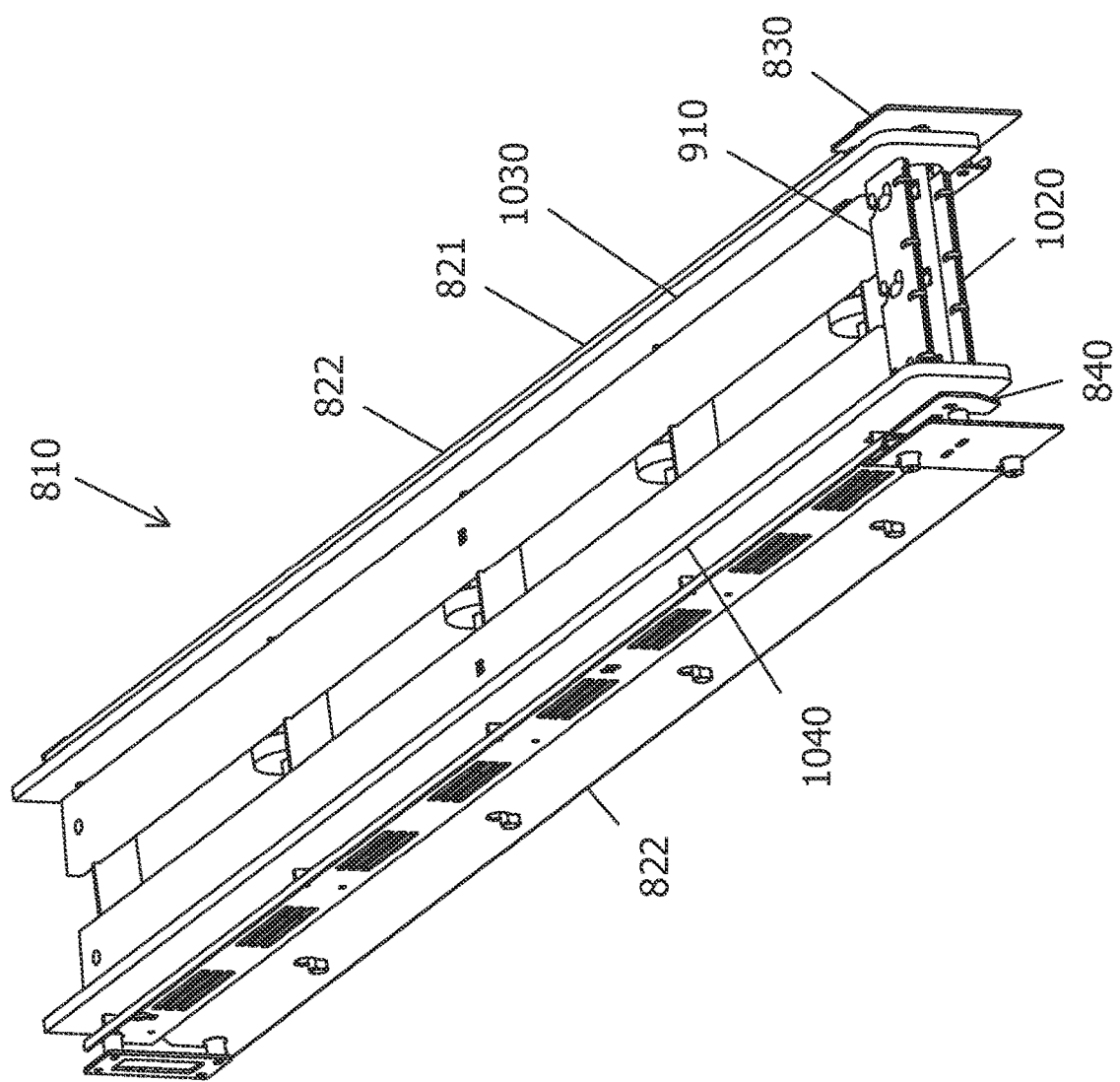
FIG. 37 is a perspective view of an alternative embodiment of the present invention containing a dynamic noser assembly.

A preferred embodiment of the present invention is illustrated in FIGS. 1-13. Turning now to FIG. 1, it is seen that a conveyor 10 is illustrated with a belt 20. A frame 30 is provided having ends 40 and 50. An idler 41 is at end 40. A drive 51 is at end 50. Any items on the belt 20 move relative to the frame 30 as the belt spins in a continuous loop about idlers at 41 and 51. The frame 30 has a frame longitudinal axis.

A frame spacer 60 is shown in FIGS. 2-9. Frame spacer 60 has a top 61, a bottom 62, a first side 63 and a second side 64. The top 61 has an edge with a relief 65, which is a cut away section of the top. The relief 65 preferably has side edges that are generally perpendicular to a relief bottom edge. A lock 70, having a riser 71 and a head 72, upstands from the bottom edge. The riser 71 and head 72 lie in the same plane as the front and rear faces of the frame spacer. The riser has a relatively narrow width, and the head had a relatively wide width. In the regard, the lock 70 has a generally T-shaped profile. A second lock 80 is also provided and has a riser 81 and a head 82. Lock 80 is preferably similar or the same as lock 70 in respect to size and function. It is appreciated that while two locks are illustrated, that there could be more or fewer locks or locks of varying shapes without departing from the broad aspects of the present invention.

The frame spacer 60 generally lies in a plane that is perpendicular to the frame longitudinal axis. A second frame spacer 90 can be provided. Frame spacer 90 lies in a plane that is parallel to the plane of frame spacer 60.

Frame spacer 90 has a top 91, a bottom 92, a first side 93 and a second side 94. The top 91 has an edge with a relief 95, which is a cut away section of the top. The relief 95 has side edges that are generally perpendicular to a relief bottom edge. A lock 100, having a riser 101 and a head 102, upstands from the relief bottom edge. The riser 101 and head 102 lie in the same plane as the front and rear faces of the frame spacer. The riser has a relatively narrow width, and the head had a relatively wide width. In the regard, the lock 100 has a generally T-shaped profile. A second lock 110 is also provided and has a riser 111 and a head 112. Lock 110 is preferably similar or the same as lock 100 in respect to size and function. It is appreciated that while two locks are illustrated, that there could be more or fewer locks without departing from the broad aspects of the present invention.

It is appreciated that while two frame spacers 60 and 90 of this type are illustrated, there could be more or fewer without departing from the broad aspects of the present invention.

A third frame spacer 120 is further provided. Frame spacer 120 has a top 121, a bottom 122 and two sides 123 and 124, respectively. A relief 125 is provided. The relief has side edges that are generally perpendicular to a relief bottom edge. A tab 126 preferably upstands from the relief bottom edge. A relief 127 is provided. The relief has side edges that are generally perpendicular to a relief bottom edge. A tab 128 preferably upstands from the relief bottom edge.

Frame spacer 120 is farther interior on the frame 30 relative to the idler 41 as compared to frame spacers 60 and 90.

A wear strip 150 is provided. Wear strip 150 can also be called an idler wear strip, as it is positioned near an idler during use. Wear strip 150 has a top 151, a bottom 152, a first side 153, a second side 154, a first end 155 and a second end 156. Tabs can project from end 155 and span between idler rollers. Four holes 160, 170, 180 and 190 are formed through the wear strip 150. Holes 160 and 170 are preferably longitudinally aligned adjacent side 153. Holes 180 and 190 are preferably aligned adjacent side 154. Each of the holes 160, 170, 180 and 190 is preferably structurally similar or identical (although there is no requirement that each hole be so similarly or identically structured). Hole 160 has an upper cavity 161 on about the top half of the wear strip. The cavity 161 can be square or rectangular in profile when viewed from above. A lower passage 162 is also provided. The lower passage 162 has a wide gap 163 and a narrow gap 164. The wide gap 163 is preferably as wide as the upper cavity 161. The narrow gap 164 is narrower than the upper cavity 161. The upper cavity 161 is open to the top 151 of the wear strip 150. The lower passage 162 is open to the upper cavity 161 and to the bottom 152 of the wear strip 150.

The wear strip 150 is removably secured to frame spacers 60 and 90. Specifically, the locks can be received within holes on the wear strip. In the illustrated embodiment, there are four locks and four holes. There could be more or fewer locks and holes, or the locks may be shaped differently, and more than one wear strip as conveyor requirements dictate. Yet, a preferred operation can be the same. In order to secure the wear strip 150 to the frame 30, the head 72 of lock 70 is inserted through the wide gap 163 in the lower passage 162 until it reaches the upper cavity 161. Then, the wear strip 150 is moved longitudinally towards the idler 41 so that the riser 71 is received in the narrow gap 164 of the lower passage 162. The riser 71 contacts an end of the narrow gap 164 forming a travel stop of the wear strip 150. That is, further longitudinal travel is prohibited. Further, the head 72 is wider than the narrow gap 164 whereby the wear strip 150 cannot be vertically moved relative to the frame spacer 60. Still further, the relieve side edges engage the sides 153 and 154 of the wear strip 150 preventing lateral movement of the wear strip 150 relative to the frame spacer 60. Similar engagement is made between lock 80 and hole 180. Further similar engagement is made between locks 100 and 110 of frame spacer 90 and holes 170 and 190, respectively.

A longitudinal wear strip 200 having opposed ends is provided. A hole 201 is adjacent one or both ends of the strip 200. A second longitudinal wear strip 210 is also provided and has opposed ends. A hole 211 is adjacent one or both ends of the strip 210. Longitudinal wear strip can be supported at one end by frame spacer 120. In this regard, the hole 201 can be aligned with tab 126 whereby lowering of the longitudinal wear strip 200 fixes the strip in place. This is accomplished longitudinally by tab 126 and hole 201, and laterally by the side edges of relief 125 engaging the sides of the longitudinal wear strip 200. Similarly, longitudinal wear strip can be supported at one end by frame spacer 120. In this regard, the hole 211 can be aligned with tab 128 whereby lowering of the longitudinal strip 210 fixes the strip in place. This accomplished longitudinally by tab 128 and hole 211, and laterally by side edges of relief 127 engaging the sides of the longitudinal wear strip 210.

It is noted that when the longitudinal wear strips 200 and 210 are in place, that they abut the wear strip 150 thereby preventing it from moving longitudinally relative to the frame 30. In this regard, the longitudinal wear strips 200 and 210 complete the locking of the wear strip 150.

While not shown, it is appreciated that a second wear strip, oppositely oriented, can be at the other end 50 of the frame wherein the wear strip tabs extend towards the drive 51. The same longitudinal wear strips can simultaneously abut the second wear strip locking in into place as well.

Turning now to FIGS. 14-20, it is seen that an additional embodiment of the present invention is illustrated. A conveyor 310 is provided having a frame 320 with opposed sides 321 and 322, respectively. The frame 320 has a top and a bottom. Eight frame spacers are illustrated. It is appreciated that while eight frame spacers are illustrated, that there could be more or fewer without departing from the broad aspects of the present invention. Frame spacer 330 has two locks, namely lock 331 and lock 332. Frame spacer 340 has two locks, namely lock 341 and lock 342. Frame spacer 350 has two locks, namely lock 351 and lock 352. Frame spacer 360 has two locks, namely lock 361 and lock 362. Frame spacer 370 has two locks, namely lock 371 and lock 372. Frame spacer 380 has two locks, namely lock 381 and lock 382. Frame spacer 390 has two locks, namely lock 391 and lock 392. Frame spacer 400 has two locks, namely lock 401 and lock 402. Each lock preferably has a riser and a head, wherein the head had a head width that is wider than riser width. In this regard, each lock preferably is generally T-shaped.

A wear strip 410 having holes 411, 412, 413 and 414 are provided. Each hole has an upper cavity and a lower passage with a wide gap and a narrow gap. In this regard, each hole can interface with a lock. Specifically, the hole 411 can be secured by lock 331. Hole 412 can be secured by lock 341. Hole 413 can be secured by lock 351. Hole 414 can be secured by lock 361. The wear strip is shown locked in FIG. 14 and unlocked in FIG. 16. The wear strip can be pivoted about the radius of the corner section of the frame to lock and unlock the wear strip.

A wear strip 420 having holes 421, 422, 423 and 424 are provided. Each hole has an upper cavity and a lower passage with a wide gap and a narrow gap. In this regard, each hole can interface with a lock. Specifically, the hole 421 can be secured by lock 332. Hole 422 can be secured by lock 342. Hole 423 can be secured by lock 352. Hole 424 can be secured by lock 362. The wear strip is shown locked in FIG. 14 and unlocked in FIG. 16. The wear strip can be pivoted about the radius of the corner section of the frame to lock and unlock the wear strip.

It is appreciated that wear strips 410 and 420 are an outer and inner pair of wear strips that approach one side of a corner. The wear strips are unlocked by moving them away from the corner relative to the frame 320.

A wear strip 430 having holes 431, 432, 433 and 434 are provided. Each hole has an upper cavity and a lower passage with a wide gap and a narrow gap. In this regard, each hole can interface with a lock. Specifically, the hole 431 can be secured by lock 371. Hole 432 can be secured by lock 381. Hole 433 can be secured by lock 391. Hole 434 can be secured by lock 401. The wear strip is shown locked in FIG. 14 and unlocked in FIG. 16. The wear strip can be pivoted about the radius of the corner section of the frame to lock and unlock the wear strip.

A wear strip 440 having holes 441, 442, 443 and 444 are provided. Each hole has an upper cavity and a lower passage with a wide gap and a narrow gap. In this regard, each hole can interface with a lock. Specifically, the hole 441 can be secured by lock 372. Hole 442 can be secured by lock 382. Hole 443 can be secured by lock 392. Hole 444 can be secured by lock 402. The wear strip is shown locked in FIG. 14 and unlocked in FIG. 16. The wear strip can be pivoted about the radius of the corner section of the frame to lock and unlock the wear strip.

It is appreciated that wear strips 430 and 440 are an outer and inner pair of wear strips that approach one side of a corner. The wear strips are unlocked by moving them away from the corner relative to the frame 320.

A lower spacer 450 having locks 451 and 452 is also provided. The locks are formed of inwardly oriented arms.

An outer guide 460 is shown. The outer guide 460 has a top lip 461 and a bottom lip 462. The top and bottom lips 461 and 462 define a channel 463 for receiving a belt. A slot 464 is formed in the outer side of the guide 460 (opposite side as channel 463). The lock 451 can lock the guide in place by securing to the slot 464. The guide is unlocked by pivoting the guide inwards so that the lock is no longer engaged within the slot. The guide cannot become unlocked when a belt is in place.

An inner guide 470 is shown. The inner guide 470 has a top lip 471 and a bottom lip 472. The top and bottom lips 471 and 472 define a channel 473 for receiving a belt. A slot 474 is formed in the outer side of the guide 470 (opposite side as channel 473). The lock 452 can lock the guide in place by securing to the slot 474. The guide is unlocked by pivoting the guide inwards so that the lock is no longer engaged within the slot. The guide cannot become unlocked when a belt is in place.

Turning now to FIGS. 21-25, it is seen that a conveyor 510 with a frame 520 is provided. The frame 520 has a first section 521 separated from a second section 522 with a joint 530. The frame changes pitch, or elevation, at the joint 530. Three pegs 531, 532 and 533 are inwardly facing from the joint. A cope 540 is illustrated having a top 541 and a bottom 542. A slot 550 having a notch 551 is provided. A slot 560 having a notch 561 is provided. A slot 570 having a notch 571 is provided. The cope 540 is secured to the joint 530 by aligning the slots with the pegs, pressing the cope onto the pegs, and then twisting the cope 540 so that the pegs are securely received within the respective notches of the slots. Disassembly occurs in the opposite manner.

An upper guide 580 is provided. A lower guide 590 having a first piece 591 and a second piece 592 is also provided. The belt can pass between the first and second pieces of the lower guide. The guides maintain the belt is position relative to the frame when a change in pitch of the frame occurs to prevent separation of the belt from the frame.

Turning now to FIGS. 26-29, it is seen that another embodiment of the present invention is illustrated. A conveyor 610 with a frame 620 is illustrated. The frame 620 has sides 621 and 622. A frame spacer 630 is shown. The frame spacer 630 has a first side 631 with a lock 632, and a second side 633 with a lock 634. An end guide rail 640 is shown. Guide rail 640 has a vertical slot 641 and a horizontal slot 642. The rail is locked when the lock 632 is received within the horizontal slot 642. A second guide rail 650 is shown. Guide rail 650 has a vertical slot 651 and a horizontal slot 652. The second guide is locked when lock 634 is received within the horizontal slot 652.

A frame spacer 660 is also shown. The frame spacer 660 has a first side 661 with a lock 662, and a second side 663 with a lock 664. A side guide rail 670 is shown. Guide rail 670 has a vertical slot 671. The guide rail is locked when the lock 662 is received within the vertical slot 671. A second guide rail 680 is shown. Guide rail 680 has a vertical slot 681. The second guide rail is locked when lock 664 is received within the vertical slot 681.

Guide rails 670 and 680, when installed, prevent the unlocking of end guide rails 640 and 650 by preventing longitudinal movement of the end guide rails.

Turning now to FIGS. 30-36, it is seen that an additional embodiment of the present invention is illustrated. A conveyor 710 is shown with a belt in FIG. 30. The conveyor has a frame 720 with opposed sides 721 and 722. An end frame spacer 730 is provided. The frame spacer 730 has three pegs 731, 732 and 733, respectively. Each peg has a post and a head that is wider than the post. A return face 740 with three pegs 741, 742 and 743, respectively, is also shown.

A noser 750 is removably supported by the end frame spacer 730. The noser 750 has a face 760 that is preferably rounded. The noser 750 also has a back 770 that is generally flat. A slot 771 with a notch 772 is provided. A slot 773 with a notch 774 is also provided. A slot 775 with a notch 776 is also provided. The slots are formed into the back 770 of the noser 750 and are open to one side. The slots and notches are preferably offset 90 degrees but could be angled differently without departing from the broad aspect of the present invention. The slots and notches are undercut wherein they have inner portions that are wider than outer portions, thereby providing wide areas to accommodate the peg heads in the slot and notch.

The noser 750 is secured to the spacer 730 by vertically aligning the slots with the pegs. The heads will fit into the wide inner portions of the slot as the noser is vertically moved into the slots. Then, the noser is slid horizontally so that the pegs are moved into the notches, respectively. In this position, with a belt in place, the noser 750 will not move as the belt moves. The noser 750 is removed from the end frame spacer 730 in the opposite manner.

Noser 780 is connected to, and disconnected from, the return face 740 in a similar manner as noser 750 is with end frame spacer 730.

Turning now to FIGS. 37-48, it is seen that an additional embodiment of the present invention is illustrated. A conveyor 810 is provided and is shown without a belt in FIG. 37. The conveyor 810 has a frame 820 with opposed sides 821 and 822. A noser frame assembly 830 is provided. The noser frame assembly 830 has a bracket 835 on side 821 and a bracket 840 on side 822. The brackets 835 and 840 collectively support three frame spacers 850, 870 and 890, respectively. While three frame spacers are illustrated in the preferred embodiment, it is appreciated that there could be more or fewer (even a single integrated piece) without departing from the broad aspects of the present invention.

End frame spacer 850 has a top 860 and a bottom 865. Three pegs 861, 862 and 863, respectively, upstand from the top 860. Each peg has a shaft and a head, wherein the head is wider than the shaft. Each head is at the distal end of the respective peg separated from the respective spacer by the respective shaft.

End frame spacer 870 has a top 880 and a bottom 885. Three pegs 881, 882 and 883, respectively, upstand from the top 880. Three pegs 886, 887 and 888, respectively, depend or extend down from the bottom 885. Each peg has a shaft and a head, wherein the head is wider than the shaft. Each head is at the distal end of the respective peg separated from the respective spacer by the respective shaft.

End frame spacer 890 has a top 900 and a bottom 905. Three pegs 906, 907 and 908, respectively, depend or extend down from the bottom 905. Each peg has a shaft and a head, wherein the head is wider than the shaft. Each head is at the distal end of the respective peg separated from the respective spacer by the respective shaft.

Figure 39:
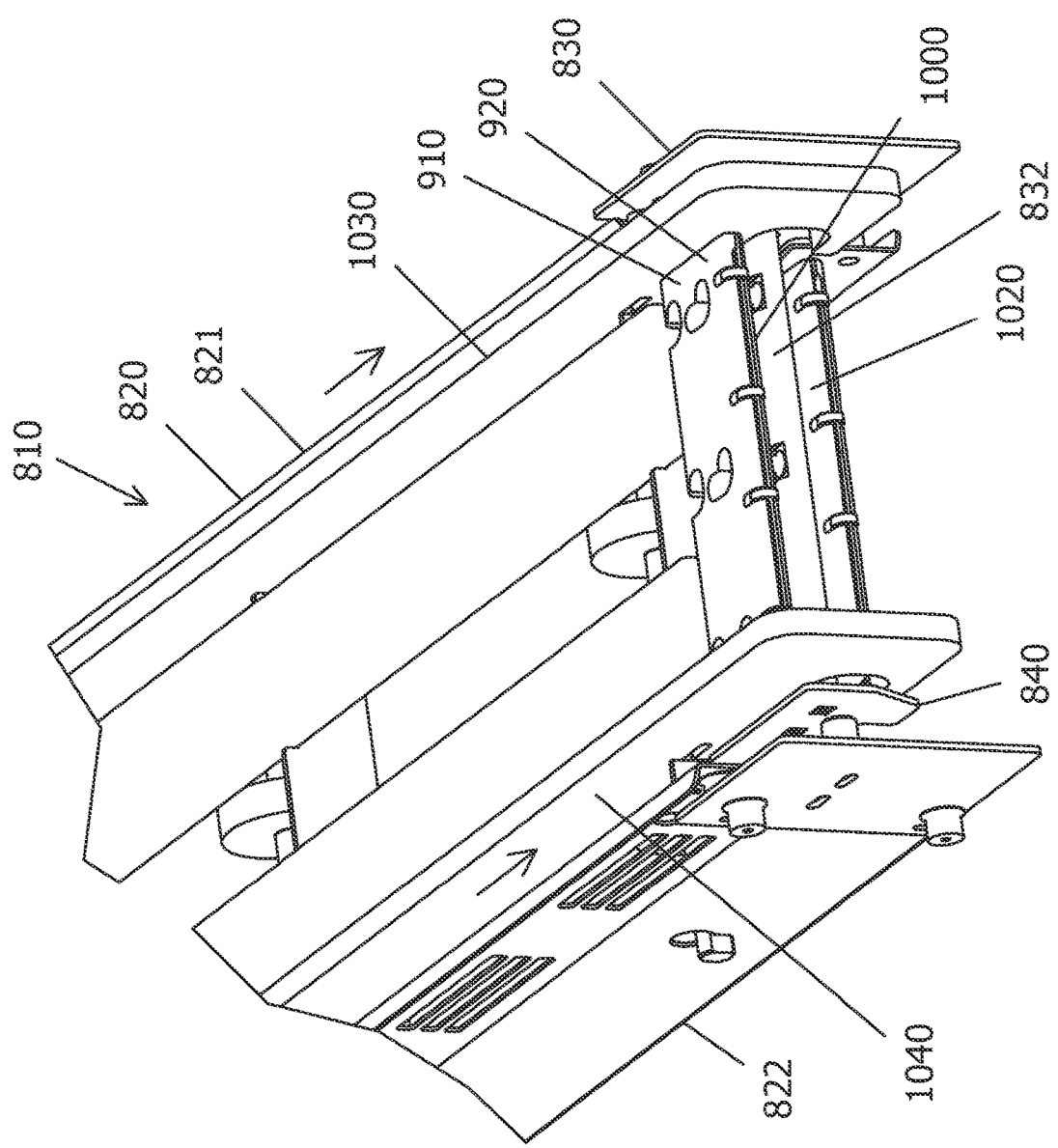
FIG. 39 is similar to FIG. 38, but shows a partial disassembly of the assembly.
Figure 40:
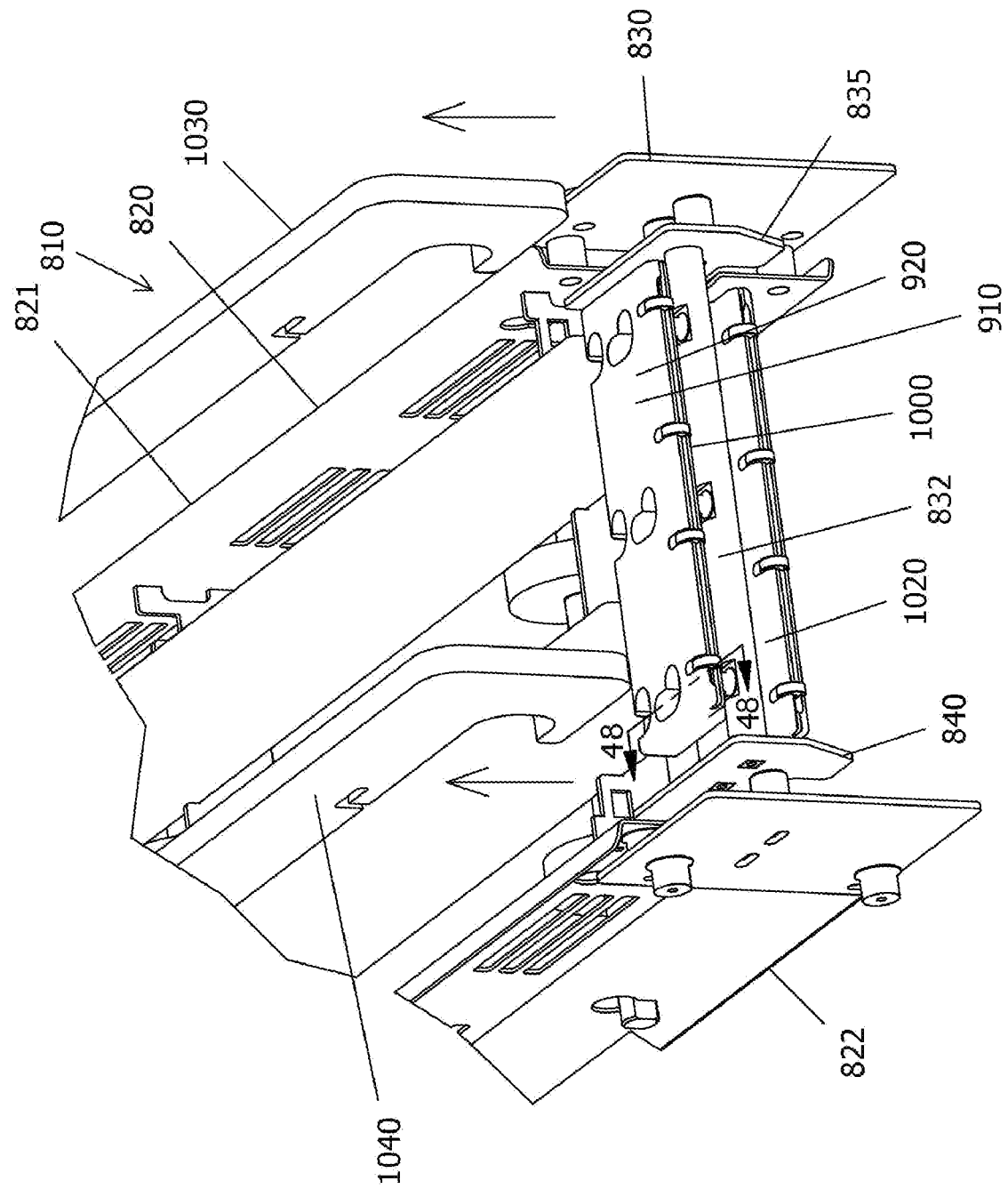
FIG. 40 is similar to FIG. 39, but shows a further step in disassembly of the assembly.

The pegs on the three end frame spacers 850, 870 and 890 are laterally aligned (three wide) and longitudinally aligned (two deep) with respect to the conveyor longitudinal axis as seen in FIGS. 39 and 40.

The noser frame assembly 830 removably supports dynamic noser assemblies 910 and 1020. Dynamic noser assembly 1020 is preferably identical to dynamic noser assembly 910. The dynamic noser assembly 910 has a noser 920 and a bearing shaft 1000 supporting at least one bearing 1010. The noser is preferably made of a solid material such as a virgin UHMW material. Yet, it is appreciated that other materials may be used without departing from the broad aspects of the present invention.

The noser 920 has an inner side 921 (bottom side), an outer side 922 (top side), opposed lateral sides 923 and 924, respectively, a rear side 925 and a front side 926 (at end of conveyor). The noser front side 926 lies in a noser front plane.

Figure 45:
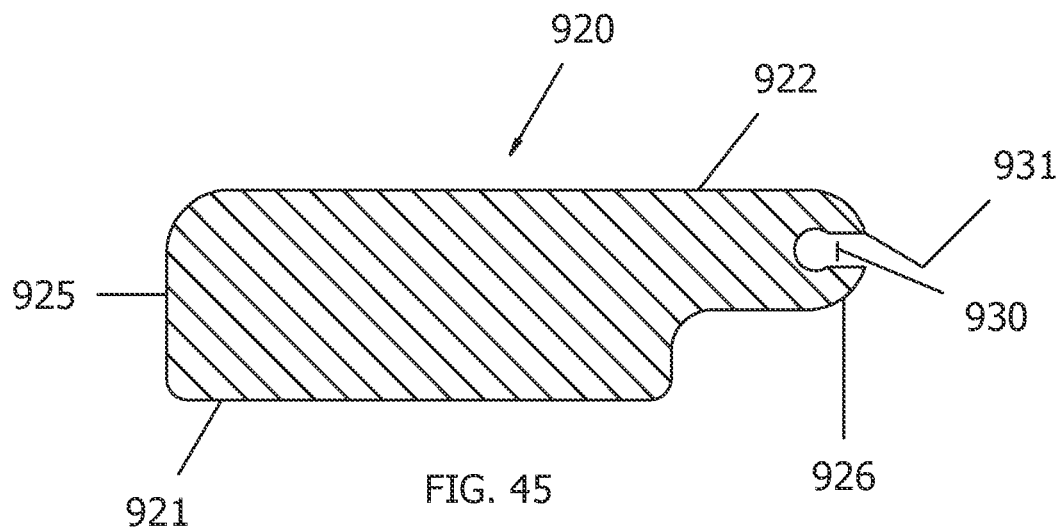
FIG. 45 is a cross-sectional view taken along line 45-45 in FIG. 44.
Figure 46:
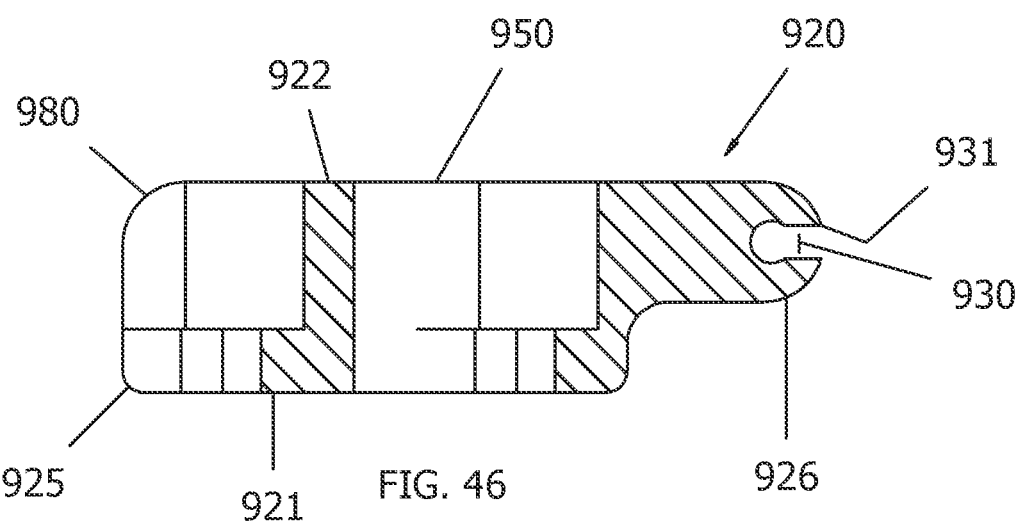
FIG. 46 is a cross-sectional view taken along line 46-46 in FIG. 44.
Figure 47:
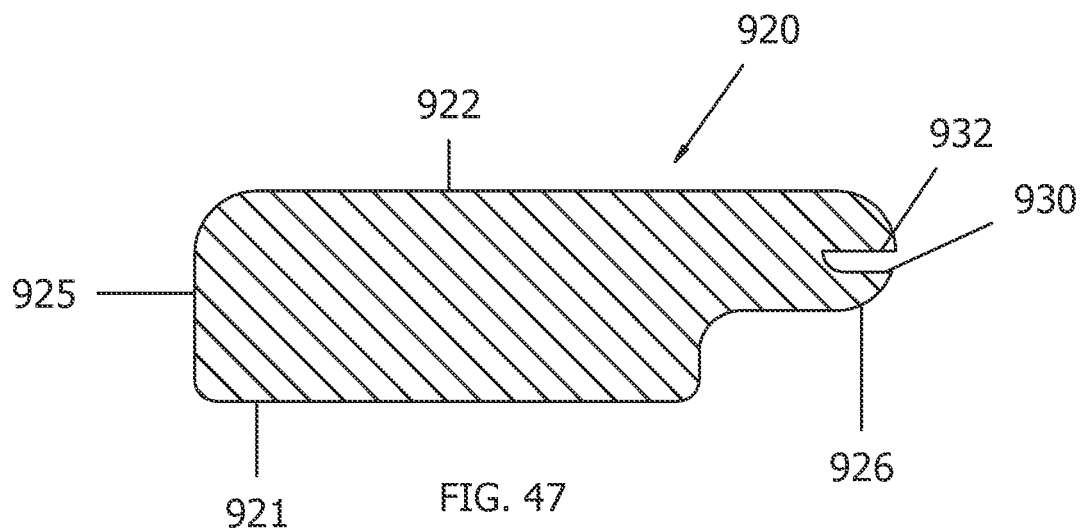
FIG. 47 is a cross-sectional view taken along line 47-47 in FIG. 44.

A channel 930 is formed into the front side 926 of the noser 920. The channel 930 has an interior 931 with opposed ends 932 and 933. The interior 931 of the channel 930 is open at one side between ends 932 and 933. Opposite the open side of the channel is an innermost side. The innermost side is preferably generally rounded and sized to receive the bearing shaft 1000. The rounded portion is preferably wider in diameter than the open side of the interior 931 of the channel 930 is tall. Thus, the smaller entry side of the interior 931 secures the bearing shaft 1000 within the channel 930. As seen in FIGS. 45, 46 and 47, the channel depth is decreased at the ends 932 and 933 so that the ends of the bearing shaft 1000 can be frictionally held by the channel 930 and also to prevent the bearing shaft 1000 from rotating relative to the channel 930.

Figure 44:
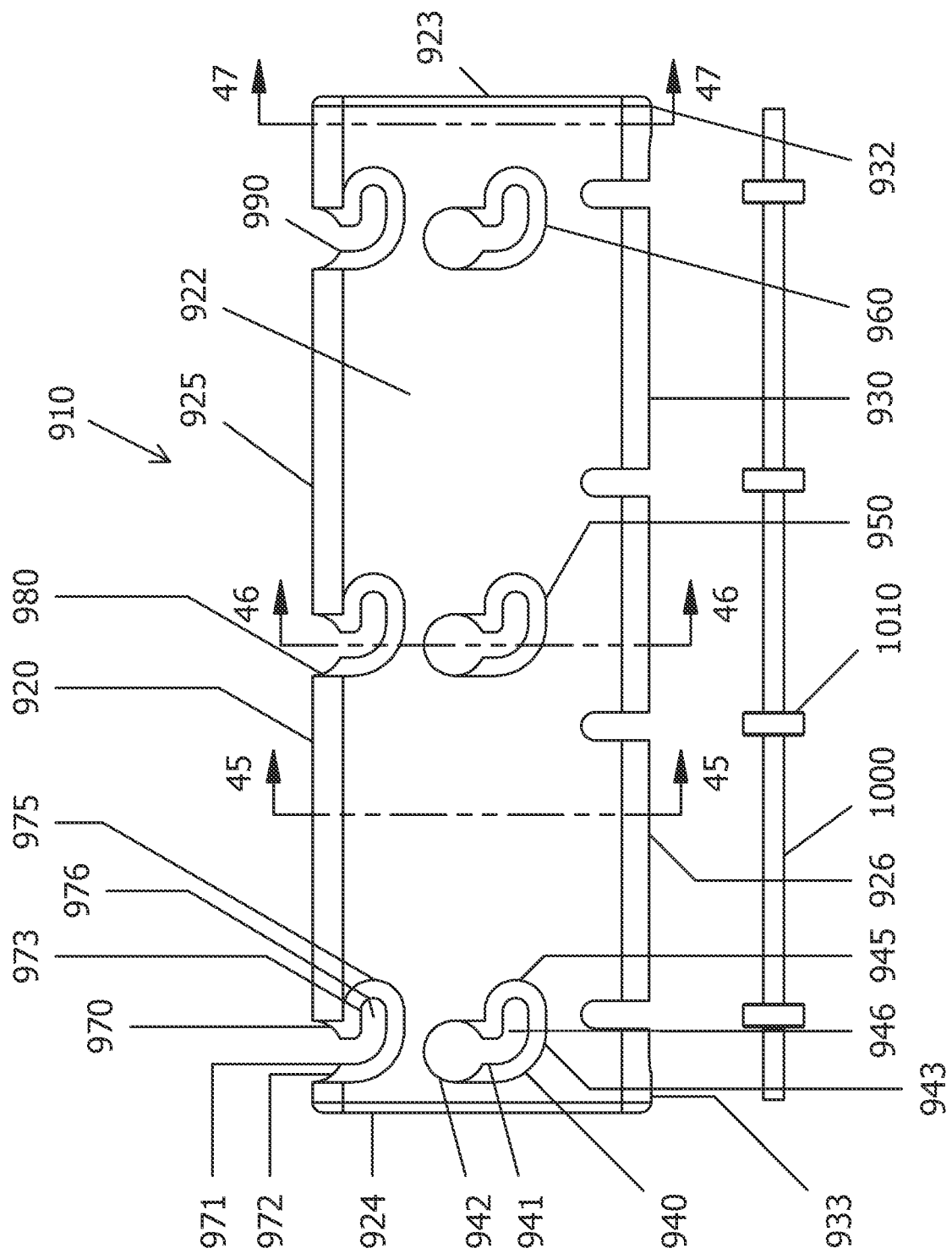
FIG. 44 is an exploded top view of the dynamic noser assembly.

Several holes 940, 950, 960, 970, 980 and 990 are formed through the noser. Holes 940, 950 and 960 are aligned between ends 923 and 924 of the noser as seen in FIG. 44. These three holes 940, 950 and 960 preferably have the same structure. Hole 940 will be described for brevity with the understanding that the other two holes are preferably identical.

Hole 940 has a slot 941 with a bottom entry 942 (through noser bottom) with a circular shape that is wide enough to allow a peg head to pass through it. The slot is aligned in a direction spanning between the noser front and rear sides. The hole 940 also has a notch 943. The notch 943 is preferably offset from the slot 941 by 90 degrees but could be angled differently without departing from the broad aspect of the present invention. The notch 943 is preferably aligned in a direction parallel with the noser front plane. The slots and notches are undercut wherein they have outer portions 945 (preferably open to the noser outer side 922) that are wider than inner portions 946 (preferably open to the noser inner side 921), thereby providing wide areas to accommodate the peg heads in the slot and notch. The peg head wide wider than the inner portion so that the head cannot pass vertically through it.

Holes 970, 980 and 990 are aligned between ends 923 and 924 of the noser as seen in FIG. 44. These three holes 970, 980 and 990 preferably have the same structure. Hole 970 will be described for brevity with the understanding that the other two holes are preferably identical.

Hole 970 has a slot 971 with a rear side entry 972 (through noser rear side 925). The slot 971 is aligned in a direction spanning between the noser front and rear sides. The hole 970 also has a notch 973. The notch 973 is preferably offset from the slot 971 by 90 degrees but could be angled differently without departing from the broad aspect of the present invention. The notch 973 is preferably aligned in a direction parallel with the noser front plane. The slots and notches are undercut wherein they have outer portions 975 (preferably open to the noser outer side 922) that are wider than inner portions 976 (preferably open to the noser inner side 921), thereby providing wide areas to accommodate the peg heads in the slot and notch. The peg head wide wider than the inner portion so that the head cannot pass vertically through it wherein the pegs can vertically lock the noser when the pegs are in the respective notches.

Holes 940 and 970 are longitudinally aligned relative to the conveyor longitudinal axis. Holes 950 and 980 are longitudinally aligned relative to the conveyor longitudinal axis. Holes 960 and 990 are longitudinally aligned relative to the conveyor longitudinal axis.

Guide rails 1030 and 1040 are provided. Each guide rail has a front end with a lower hook. The hooks can wrap around frame spacer 850. In this regard, when the hooks engage the frame spacer 850, the guide rails are vertically locked in place. The guide rails are moved longitudinally a sufficient distance so that the hooks do not engage the frame spacer before they can be removed from the frame 820.

The noser 920 is insertable onto and removable from the conveyor without tools. Insertion is accomplished by aligning the six holes of the noser 920 with the six upper pegs on the noser frame assembly. The pegs are inserted either through the bottom or rear entries and the noser 920 is moved longitudinally (relative to the conveyor) through the respective slots and then moved laterally within the respective notches. In this position, the noser cannot move longitudinally relative to the frame (shaft of pegs contacts notches) and cannot be moved vertically (peg heads bound in outer portions and are wider than inner portions). Guide rails 1030 and 1040 are inserted to lock the noser 920 in place with the pegs received within the notches. In this regard, the guide rails 1030 prevent the noser 920 from moving laterally relative to the frame. The noser 920 cannot be removed from the pegs when the pegs are received within the notches of the holes.

Figure 38:
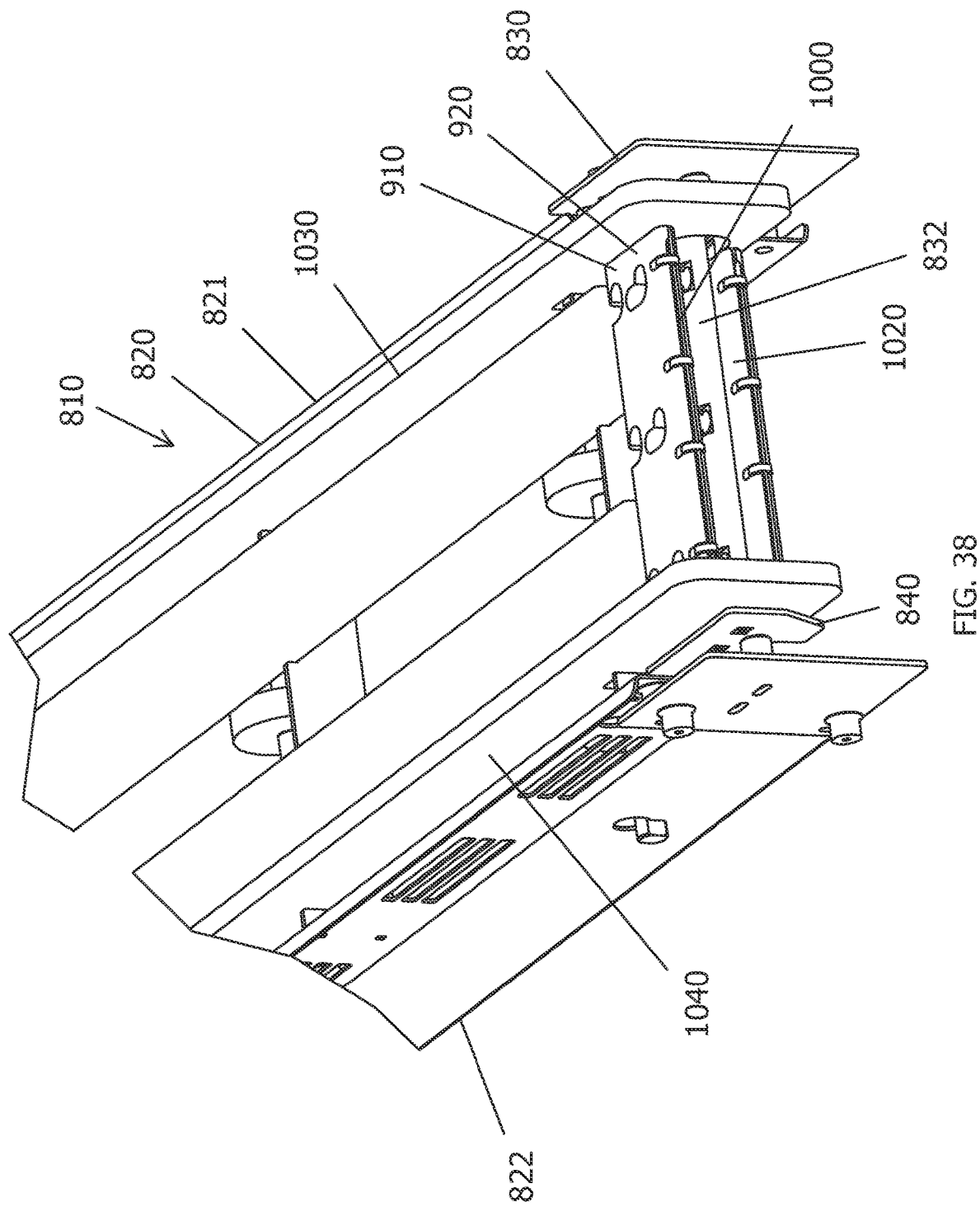
FIG. 38 is a close-up perspective view of the dynamic noser assembly shown in FIG. 37.
Figure 41:
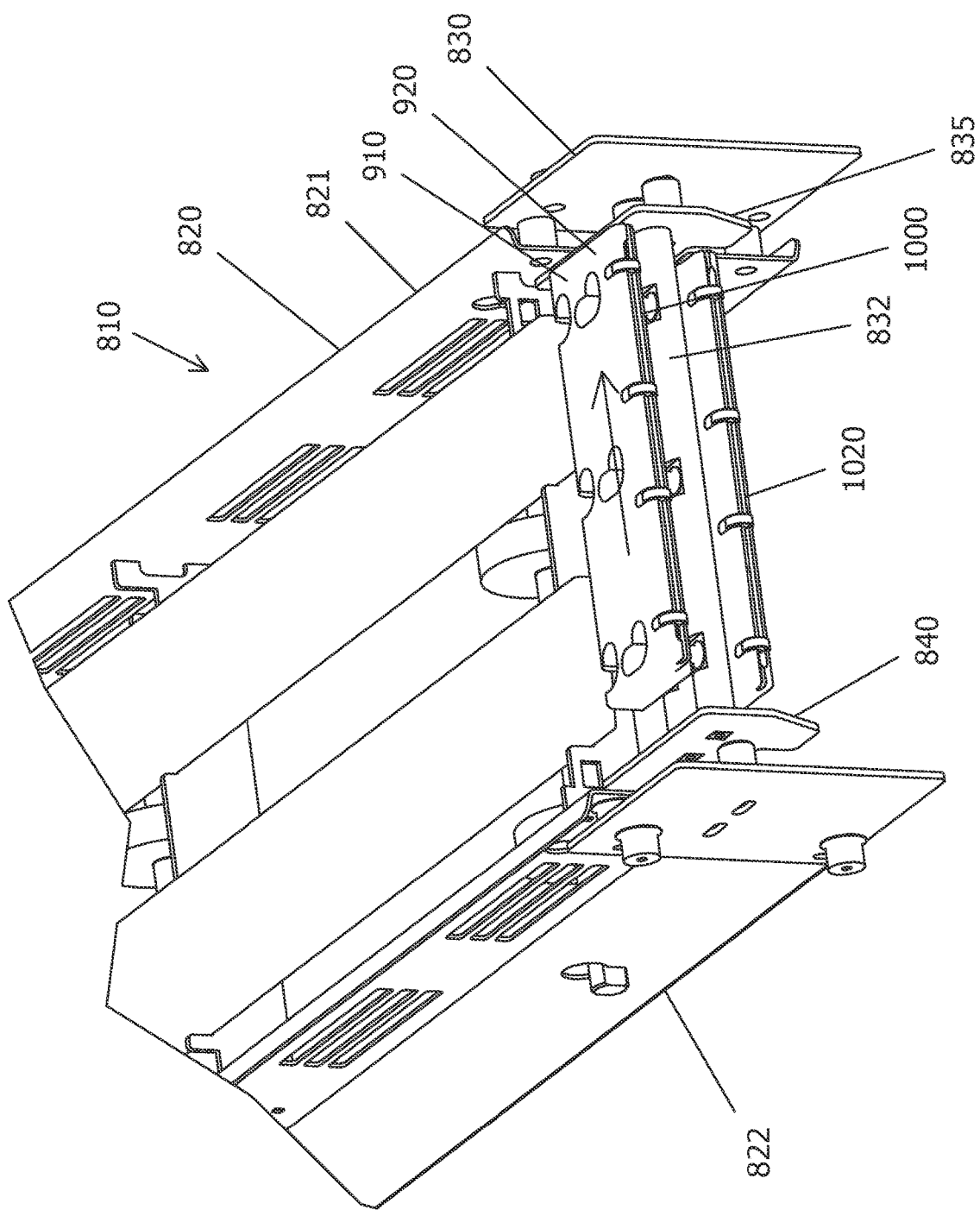
FIG. 41 is similar to FIG. 40, but shows a further step in disassembly of the assembly.
Figure 42:
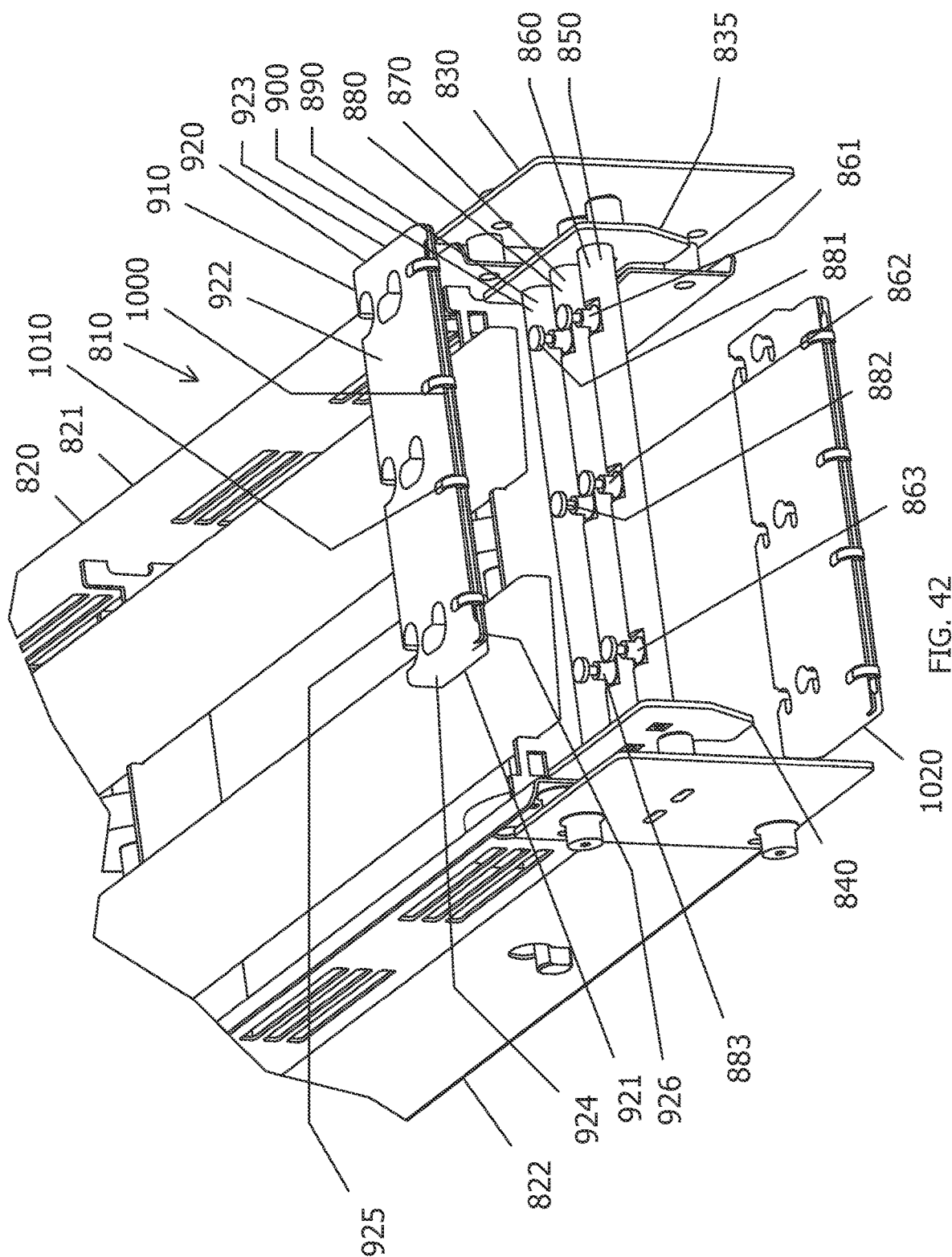
FIG. 42 is an exploded view of the components in FIG. 38.
Figure 43:
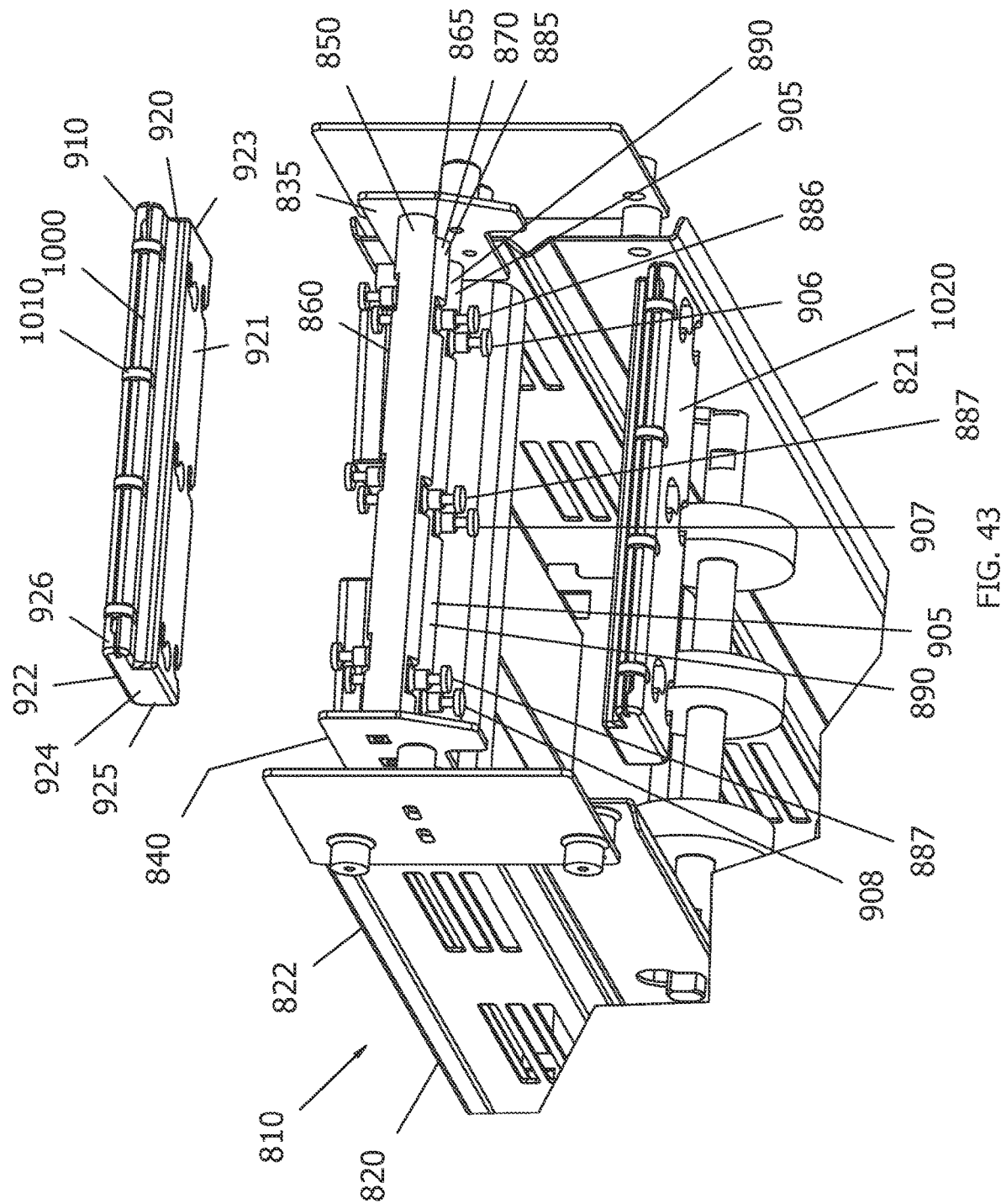
FIG. 43 is similar to FIG. 42 but shows the exploded view from an alternative viewing angle.

Removal of the noser 920 is illustrated in FIGS. 38-42. In FIG. 38, the guide rails 1030 and 1040 are in place in the noser 920 is locked. In FIG. 39, the guide rails 1030 and 1040 are moved longitudinally so that the hooks are fully disengaged from the frame spacer 850. The guide rails are illustrated being vertically removed in FIG. 40. Doing this laterally unlocks the noser 920. In FIG. 41, the noser 920 is moved laterally relative to the frame spacers 850, 870 and 890 to abut bracket 835. Doing this moves the noser so that the peg shafts are moved out of the respective notches. In FIG. 42, after the noser has been moved forward relative to the frame 820, the noser 920 is lifted from the pegs (stationary) at the bottom or rear entry of the respective holes as the noser is vertically moved.

The bearing shaft 1000 preferably has four bearings 1010. The bearings 1010 rotate about the shaft 1000. The shaft can have a generally circular profile along its longitudinal axis. The shaft 1000 is preferably stationarily held by the noser within the preferably rounded innermost portion of the interior 931 of the channel 930. It is appreciated that there could be more or fewer bearings without departing from the broad aspects of the present invention. The quantity of bearings can depend on conveyor width or other factors.

Dynamic noser assembly 910 is preferably supported by the upstanding pegs at the distal end of the carry way. Dynamic noser assembly 1020 is preferably supported by the depending or downward extending pegs at the beginning or proximal end of the return path.

Thus, it is apparent that there has been provided, in accordance with the invention, a wear strip that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A dynamic noser assembly for use with a conveyor, said dynamic noser assembly comprising:
    a noser comprising:
        a noser inner side;
        a noser outer side;
        a first lateral side;
        a second lateral side opposite of said first lateral side;
        a rear side;
        a front side;
        a first hole with a first hole slot accessible via said noser inner side, and a first hole notch; and
        a second hole with a second hole slot accessible via said rear side, and a second hole notch,
        wherein said noser is alignable with a first peg and a second peg on the conveyor to lock said noser in place relative to the conveyor when the first peg is received within said first hole notch and the second peg is received within said second hole notch; and
    a bearing shaft removably connected to said noser, said bearing shaft supporting at least one bearing.

2. The dynamic noser assembly of claim 1, wherein said first hole notch is undercut to define an inner portion and an outer portion, wherein the first peg can have a head received in said outer portion.

3. The dynamic noser assembly of claim 1, wherein:
    said noser is made of a solid material and has a channel formed in said noser front side; and
    said bearing shaft is received within said channel and said at least one bearing extends beyond said noser front side.

4. A dynamic noser assembly for use with a conveyor, said dynamic noser assembly comprising:
    a noser being removably connected to the conveyor and having:
        a front side and a rear side, said front side having a channel formed therein; and
    a bearing shaft removably received within said channel of said noser, said bearing shaft supporting at least one bearing.

5. The dynamic noser of claim 4, wherein said noser further comprises:
    a noser inner side;
    a noser outer side;
    a first lateral side;
    a second lateral side opposite of said first lateral side;
    a first hole with a first hole slot and a first hole notch; and
    a second hole with a second hole slot and a second hole notch,
    wherein said noser is alignable with a first peg and a second peg on the conveyor to lock said noser in place relative to the conveyor when the first peg is received within said first hole notch and the second peg is received within said second hole notch.

6. The dynamic noser of claim 5 wherein said first hole slot is accessible via said noser inner side and said second hole slot is accessible via said noser rear side.

* * * * *